United States Patent
Oomiya et al.

(10) Patent No.: US 10,461,688 B2
(45) Date of Patent: Oct. 29, 2019

(54) SENSOR UNIT

(71) Applicant: TAIYO YUDEN CO., LTD., Tokyo (JP)

(72) Inventors: Hisanobu Oomiya, Tokyo (JP); Akifumi Kosugi, Tokyo (JP); Hideaki Watanabe, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 203 days.

(21) Appl. No.: 15/472,054

(22) Filed: Mar. 28, 2017

(65) Prior Publication Data

US 2017/0201212 A1     Jul. 13, 2017

Related U.S. Application Data

(63) Continuation of application No. PCT/JP2015/077708, filed on Sep. 30, 2015.

(30) Foreign Application Priority Data

Oct. 2, 2014  (JP) .................. 2014-204203

(51) Int. Cl.
*H02S 50/10* (2014.01)
*H02S 30/10* (2014.01)

(52) U.S. Cl.
CPC .............. *H02S 50/10* (2014.12); *H02S 30/10* (2014.12)

(58) Field of Classification Search
CPC .......... H02S 50/10; H02S 30/10; H05K 7/142
USPC .................................... 324/761.01
See application file for complete search history.

(56) References Cited

U.S. PATENT DOCUMENTS

| | | | |
|---|---|---|---|
| 5,951,785 A | 9/1999 | Uchihashi et al. | |
| 2009/0260676 A1 | 10/2009 | McMahon et al. | |
| 2010/0263704 A1* | 10/2010 | Fornage | H02S 40/32 136/244 |
| 2010/0300509 A1 | 12/2010 | Raymond et al. | |
| 2011/0168228 A1 | 6/2011 | McGreevy et al. | |
| 2012/0100731 A1 | 4/2012 | Umemoto et al. | |
| 2013/0174887 A1 | 7/2013 | Yagi | |
| 2015/0318410 A1 | 11/2015 | Higuma | |

FOREIGN PATENT DOCUMENTS

| | | |
|---|---|---|
| CN | 201715751 U | 1/2011 |
| CN | 202394125 U | 8/2012 |
| CN | 103853164 A | 6/2014 |

(Continued)

OTHER PUBLICATIONS

International Search Report (ISR) issued in PCT/JP2015/077708 dated Dec. 2015.

(Continued)

*Primary Examiner* — Melissa J Koval
*Assistant Examiner* — Courtney G McDonnough
(74) *Attorney, Agent, or Firm* — Chen Yoshimura LLP

(57) ABSTRACT

The present invention provides, in one aspect, a sensor unit that includes: a sensor configured to measure a physical quantity that characterizes a state of a solar cell module; a wireless unit wirelessly outputting measurement results of the sensor; a case housing the sensor and the wireless unit; and a spacer configured to attach the case to a frame for the solar cell module such that the wireless unit is separated from the frame by a prescribed distance.

10 Claims, 14 Drawing Sheets

(56) References Cited

FOREIGN PATENT DOCUMENTS

| | | |
|---|---|---|
| JO | 9-271179 A | 10/1997 |
| JP | 2009-21413 A | 1/2009 |
| JP | 2009-155803 A | 7/2009 |
| JP | 2009-206416 A | 9/2009 |
| JP | 2010-123880 A | 6/2010 |
| JP | 2011-518441 A | 6/2011 |
| JP | 2011-228575 A | 11/2011 |
| WO | 2010/134572 A1 | 11/2010 |
| WO | 2012/043155 A1 | 4/2012 |
| WO | 2014/109058 A1 | 7/2014 |

OTHER PUBLICATIONS

Written Opinion (PCT/ISA/237) issued in PCT/JP2015/077708 dated Dec. 2015. (Concise Explanation of Relevance: This Written Opinion considers that the some of claims are described by or obvious over the references, US. Patent Pub No. 1 and Foreign Patent Document Nos. 1-10 cited in ISR above.).
English translation of Written Opinion (PCT/ISA/237) issued in PCT/JP2015/077708 dated Dec. 2015.
Chinese Office Action dated Mar. 12, 2018, in a counterpart Chinese patent application No. 201580053818.2.
Chinese Office Action dated Nov. 16, 2018, in a counterpart Chinese patent application No. 201580053818.2. (A machine translation (not reviewed for accuracy) attached.).
Japanese Office Action dated Dec. 11, 2018, in a counterpart Japanese patent application No. 2016-552112. (A machine translation (not reviewed for accuracy) attached.).

\* cited by examiner

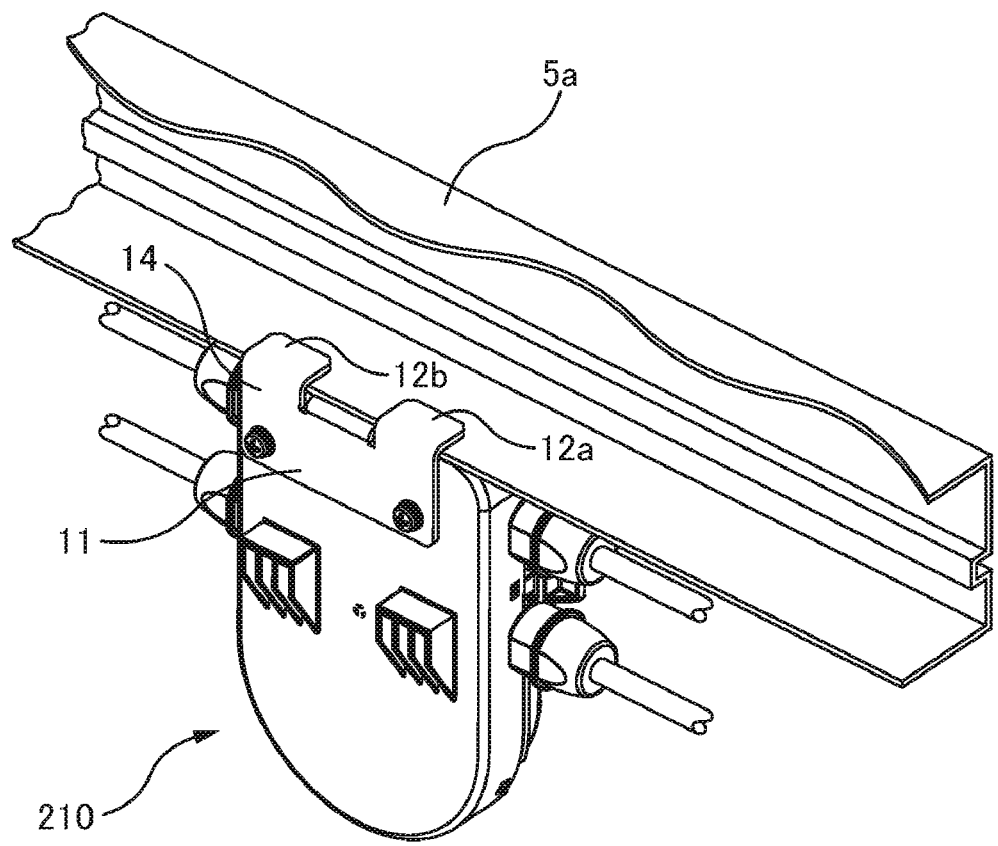
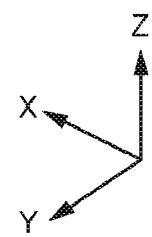
FIG. 13

SENSOR UNIT

BACKGROUND OF THE INVENTION

Technical Field

The present invention relates to a sensor unit that is attached to a frame for a solar cell module and more particularly to a sensor unit that has a wireless communication feature.

Background Art

Solar power generation systems typically include a large number of solar cell modules, and a large amount of time and labor is required for maintenance personnel to inspect those solar cell modules. One known solution to this problem is fault diagnostic systems, in which sensor units connected to the solar cell modules measure the output current and output voltage of the solar cell modules, and those measurement results are then sent wirelessly to a remotely installed fault diagnostic device that monitors for and diagnoses system malfunctions (see Japanese Patent Application Laid-Open Publication No. 2010-123880, for example).

As described in Patent Document 1, these sensor units can be removably attached to the rear surface sides of the solar cell modules. Patent Document 1 does not disclose a specific method of attaching the sensor units to the solar cell modules, but typically this type of sensor unit is attached to the frame of a stand using fastening bolts.

RELATED ART DOCUMENT

Patent Document

Patent Document 1: Japanese Patent Application Laid-Open Publication No. 2010-123880

SUMMARY OF THE INVENTION

Therefore, the present invention aims to provide a sensor unit that can be attached to a frame for a solar cell module in a state in which a wireless unit is separated from the frame by a prescribed distance. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a sensor unit, including: a sensor configured to measure a physical quantity that characterizes a state of a solar cell module; a wireless unit wirelessly outputting measurement results of the sensor; a case housing the sensor and the wireless unit; and a spacer configured to attach the case to a frame for the solar cell module such that the wireless unit is separated from the frame by a prescribed distance.

In the present application, the problem to be solved as well as the means for solving that problem are described and illustrated in detail in the Detailed Description of Embodiments and Drawings sections.

The present invention aims makes it possible to provide a sensor unit that can be attached to a frame for a solar cell module in a state in which a wireless unit is separated from the frame by a prescribed distance. It is to be understood that both the foregoing general description and the following detailed description are exemplary and explanatory, and are intended to provide further explanation of the invention as claimed.

BRIEF DESCRIPTION OF THE DRAWINGS

FIG. 13 is a rear perspective view illustrating how the sensor unit according to Embodiment 2 of the present invention is fixed to the frame of a solar cell module using the attachment illustrated in FIG. 11.

DETAILED DESCRIPTION OF EMBODIMENTS

Figure 1:
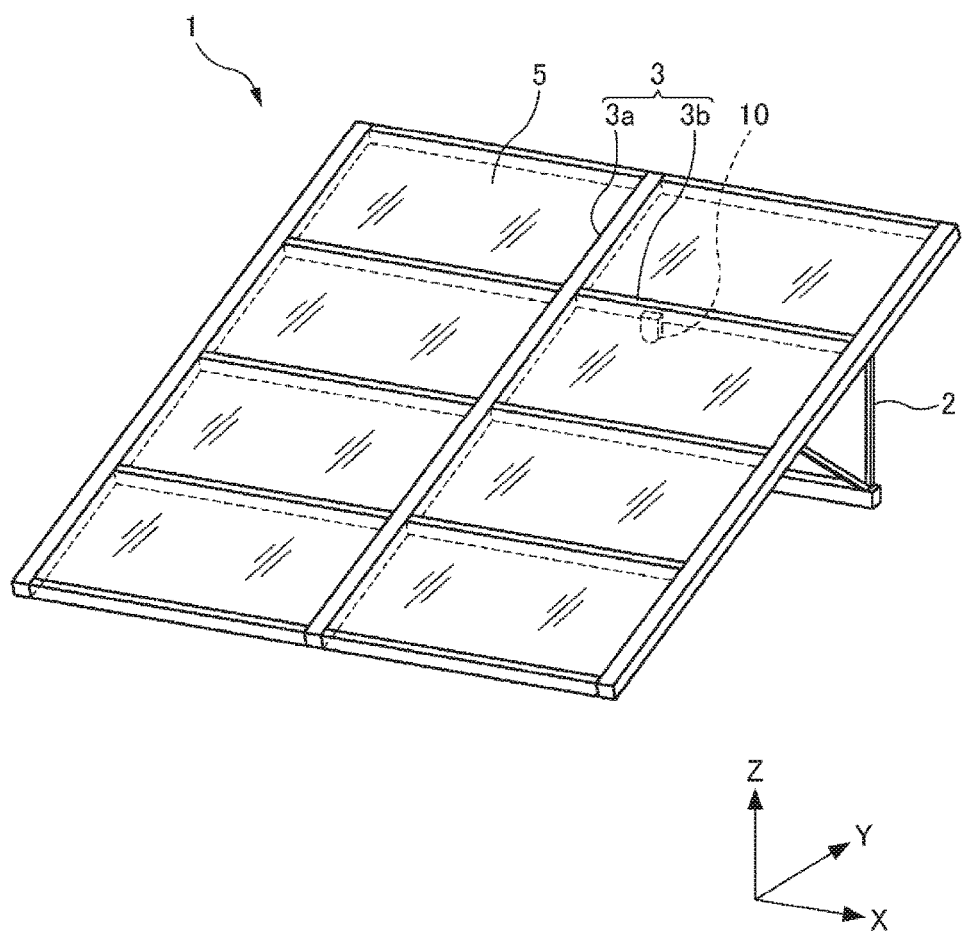
FIG. 1 schematically illustrates an example of a stand for a solar power generation system to which a sensor unit according to an embodiment of the present invention is attached.

Next, various embodiments of the present invention will be described with reference to figures as appropriate. Here, the same reference characters will be used for components that are the same in the figures.

<Embodiment 1>

<Overall Configuration of Solar Power Generation System>

Figure 2:
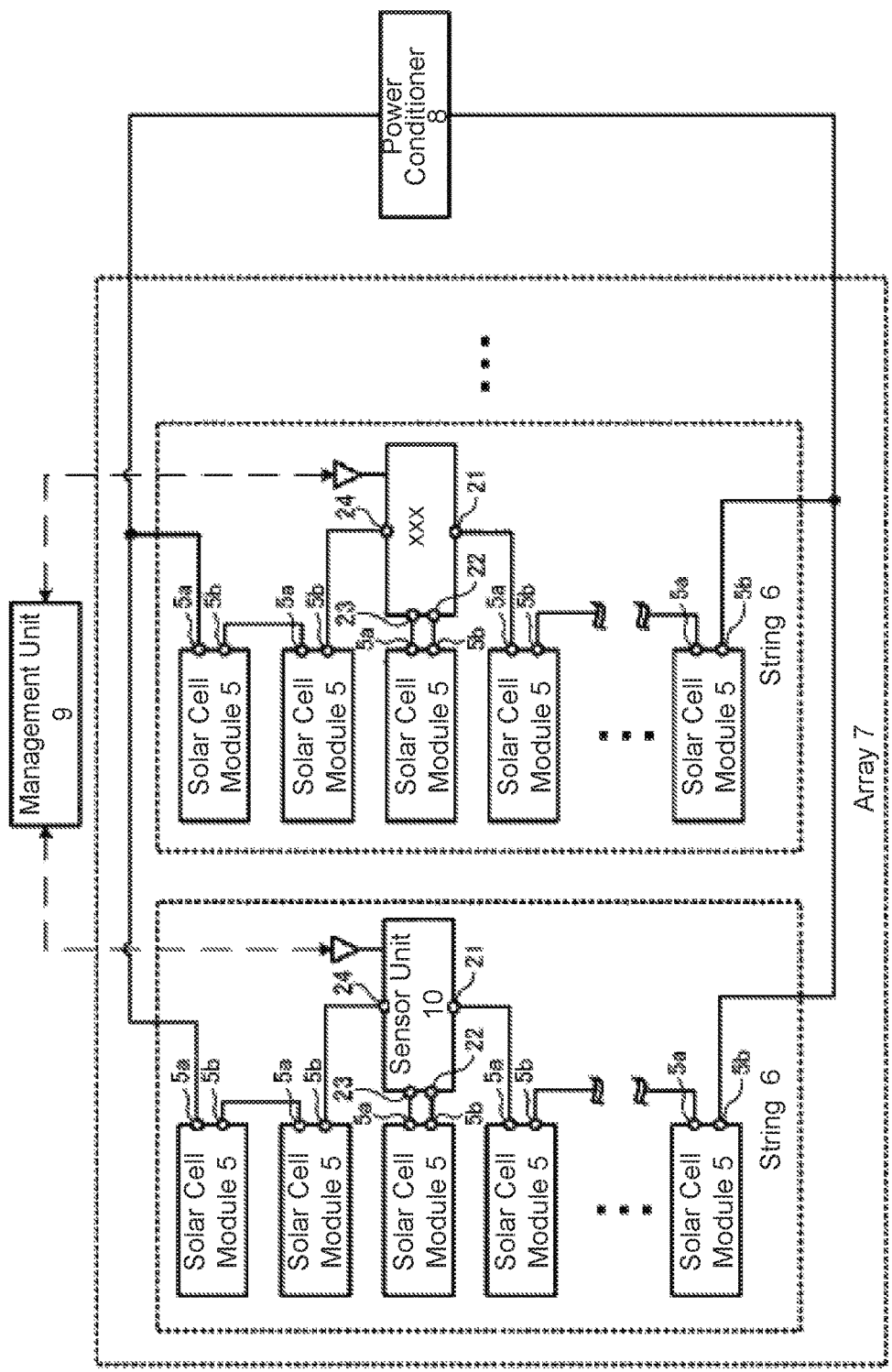
FIG. 2 is a block diagram functionally illustrating a solar power generation system that includes the sensor unit according to the embodiment of the present invention.
Figure 3:
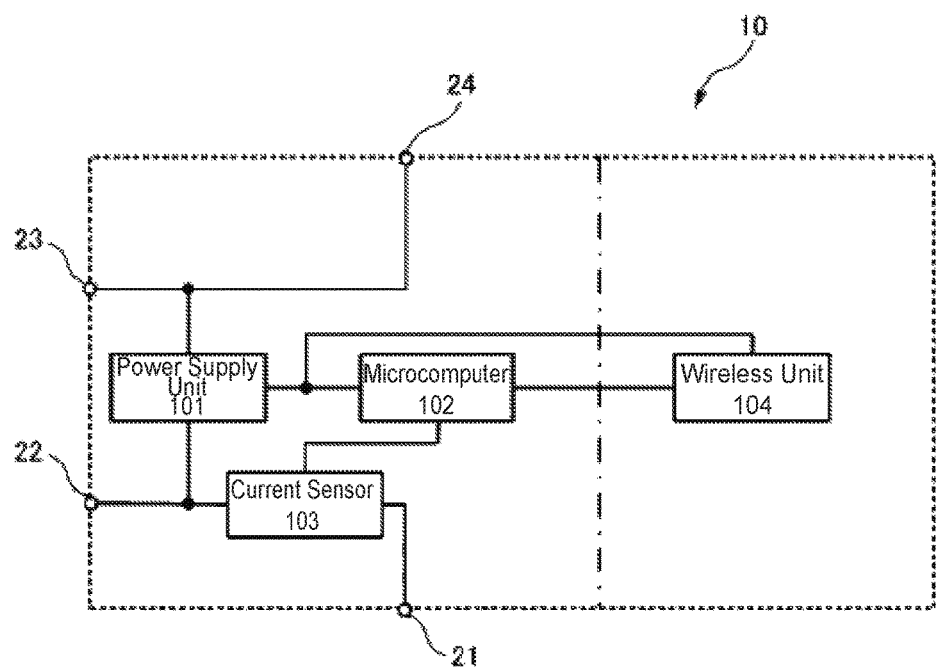
FIG. 3 is a block diagram functionally illustrating the sensor unit according to the embodiment of the present invention.

Next, the overall configuration of an exemplary solar power generation system that includes a sensor unit according to an embodiment of the present invention will be described with reference to FIGS. 1 to 3. In FIG. 1, the X axis, Y axis, and Z axis are defined as follows. The Z axis is defined running in the vertical direction, the X axis is defined running in the direction of a horizontal frame of a stand, and the Y axis is defined in a direction that is orthogonal to both the X axis and the Z axis.

Figure 6:
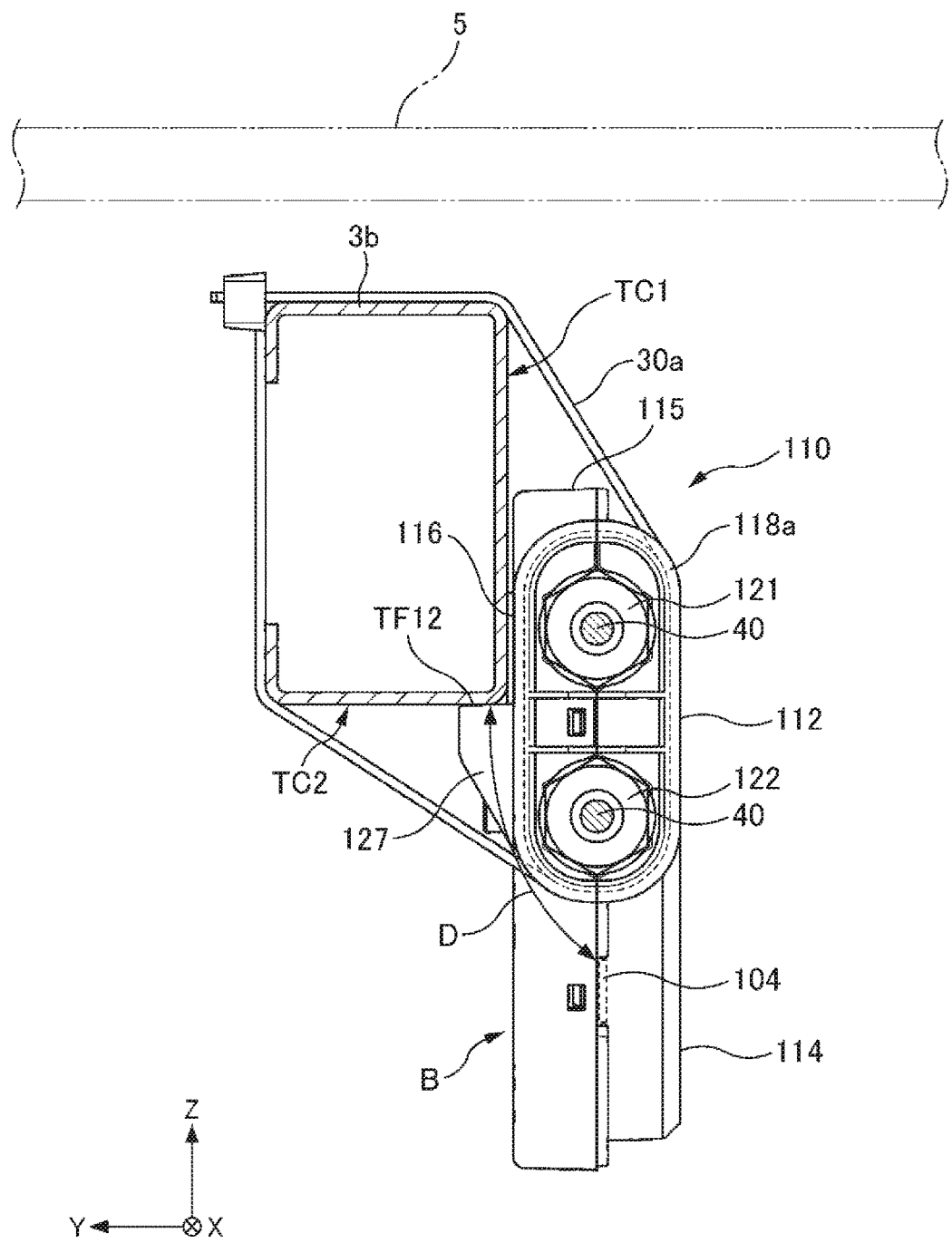
FIG. 6 is a side view illustrating the sensor unit according to Embodiment 1 of the present invention attached to the frame of the stand.
Figure 7B:
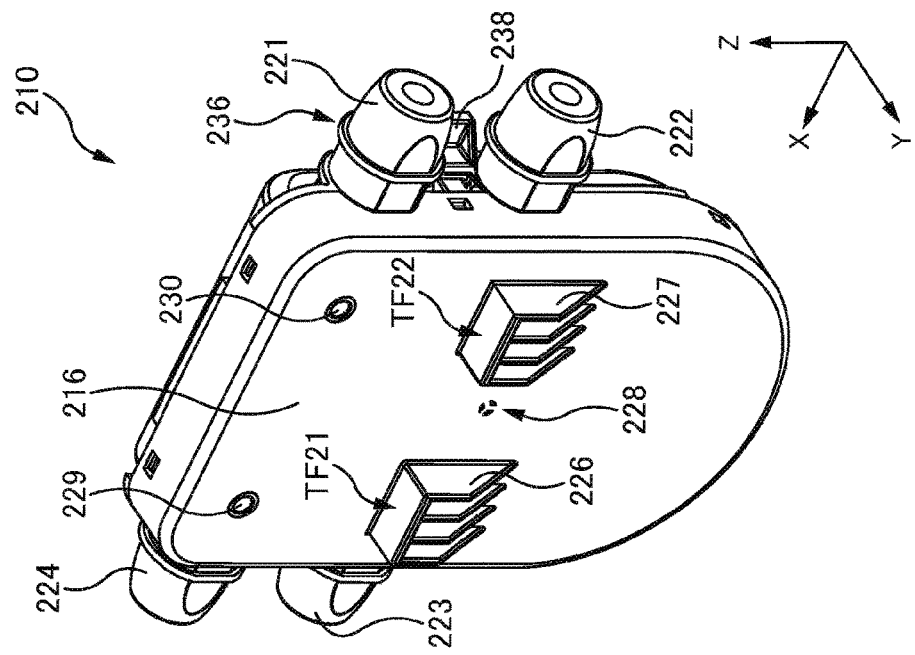
FIGS. 7A and 7B include a front view and a rear perspective view schematically illustrating a sensor unit according to Embodiment 2 of the present invention.
Figure 7A:
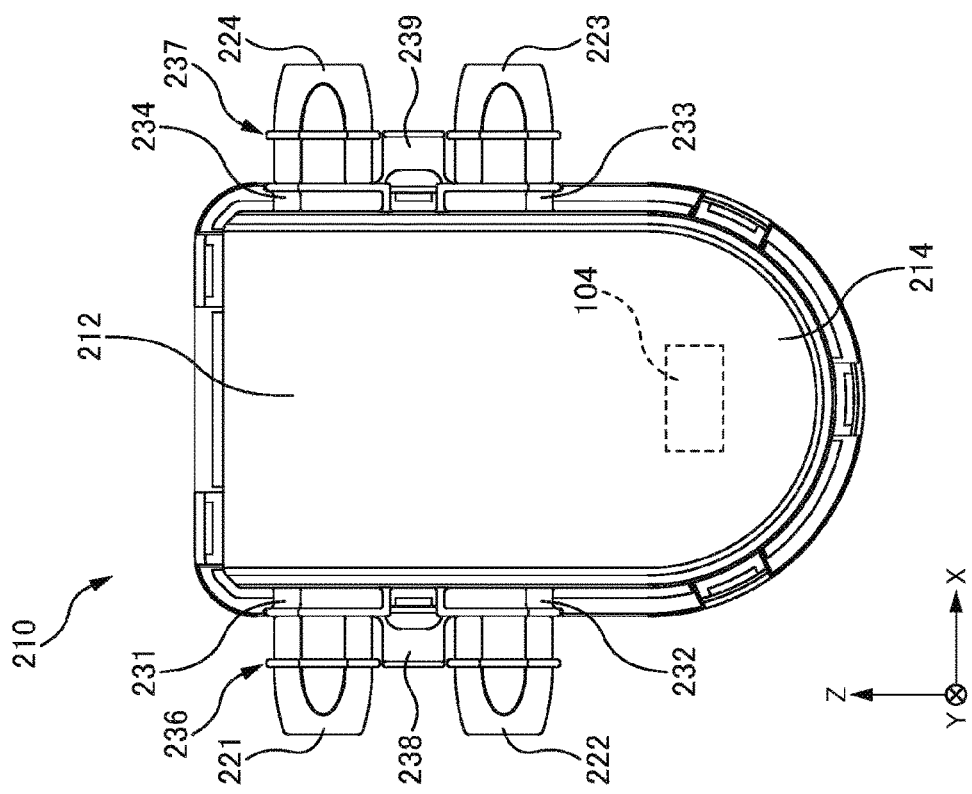
Figure 10:
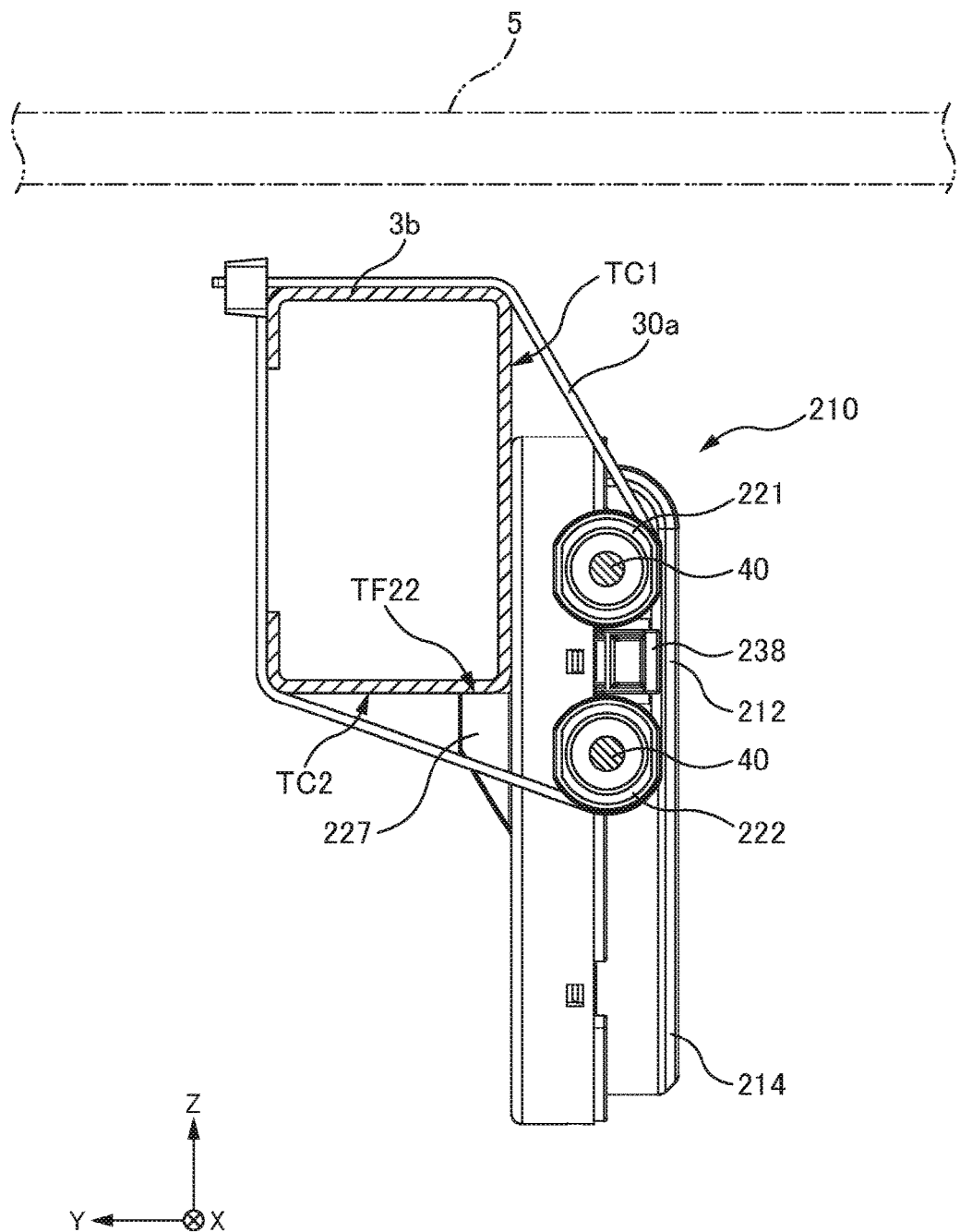
FIG. 10 is a side view illustrating the sensor unit according to Embodiment 2 of the present invention attached to the frame of the stand.

FIG. 1 schematically illustrates a stand that can be used for the solar power generation system in the present invention. The sensor unit according to this embodiment of the present invention is attached to this stand. More specifically, as illustrated in FIG. 1, a solar cell module stand 1 includes props 2 that are arranged contacting the ground and a stand frame 3 that is supported by the props 2. The stand frame 3 includes vertical frames 3a that are supported by the props 2 and horizontal frames 3b that are also supported by the props 2. As illustrated in the figure, the vertical frames 3a and the horizontal frames 3b are fitted together to form a grid shape. In the present specification, the vertical frames 3a and the horizontal frames 3b will be referred to collectively as the stand frame 3. The stand frame 3 is made of a metal material such as stainless steel or aluminum, for example. As illustrated in FIGS. 6 and 10, in the present embodiment the stand frame 3 has a C-shaped cross section, for example, but the stand frame 3 is not limited this cross-sectional shape.

Other possible cross-sectional shapes include rectangular shapes, circular shapes, T-shapes, and H-shapes, for example. Moreover, in FIG. 1, the two props 2 are arranged on both sides of the stand in the X axis direction to support a solar cell module 5 at an incline. Alternatively, however, a single prop may be arranged attached to the center of the stand 1, and the solar cell module 5 may be supported by this single prop.

The solar cell module 5 is attached to the stand 1 that includes the grid-shaped stand frame 3. The solar cell module 5 includes solar cells that are secured to a rectangular aluminum frame, for example. Each solar cell includes a plurality of photovoltaic elements that take advantage of the photovoltaic effect to convert the light energy in sunlight to electrical power. The solar cell module 5 is mounted on the stand 1 by using fasteners such as bolts to fix the frame of the solar cell module 5 to the vertical frames 3a and/or the horizontal frames 3b of the stand 1.

A sensor unit 10 according to this embodiment of the present invention is attached to the stand frame 3 of the stand 1 (that is, to the vertical frames 3a and/or the horizontal frames 3b). FIG. 1 illustrates a configuration that includes just a single sensor unit 10, but a separate sensor unit 10 may be provided for each string 6 that includes a plurality of the solar cell modules 5, for example. It is preferable that the sensor unit 10 be arranged on the rear side surface of the stand frame 3 (that is, on the surface on the side opposite to the mounting surface for the solar cell module 5) in order prevent the sensor unit 10 from interfering with the sunlight incident on the solar cell module 5. In the present embodiment, the sensor unit 10 is attached to one of the horizontal frames 3b, but the sensor unit 10 may be attached to either of the vertical frames 3a and the horizontal frames 3b.

Furthermore, the solar cell module 5 does not necessarily need to be mounted on the stand 1. For example, the solar cell module 5 may be attached to a float for floating on water, or the solar cell module 5 may be installed on a roof. In these cases, the sensor unit 10 can be attached to the frame of the solar cell module 5 itself using an attachment (an example of a fastening unit), as will be described later in a modification example.

Next, the functional configuration of a solar power generation system to which the sensor unit of the present invention can be applied will be described with reference to FIG. 2. The solar power generation system illustrated in FIG. 2 includes an array 7 that includes a large number of the solar cell modules 5, a power conditioner 8 that converts the DC power from the array 7 to AC power, and a management unit 9 that is configured to be able to communicate wirelessly with the sensor unit 10.

The array 7 includes a plurality of strings 6 that are connected in parallel. Each of the plurality of strings 6 includes a plurality of the solar cell modules 5 that are connected in series and one of the sensor units 10. Moreover, the plurality of strings 6 are connected in parallel to the power conditioner 8.

As will be described in more detail later, the sensor unit 10 in each of the strings 6 can measure physical quantities that characterize the state of the solar cell modules 5 included in that string 6, such as the current, voltage, or power output from those solar cell modules 5 or the temperature of those solar cell modules 5. The measurement results obtained from these measurements are then sent from an antenna of the sensor unit 10 to the management unit 9 for fault diagnosis. Alternatively, the sensor unit 10 may itself perform this fault diagnosis on the basis of the measured values and may then simply send the diagnostic results to the management unit 9. In this case, the diagnostic results may be included with the measurement results when sent.

The management unit 9 is configured to be able to communicate wirelessly with the plurality of sensor units 10. The management unit 9 of the present embodiment is connected to and can communicate with a host server (not illustrated in the figures), thereby making it possible to send the measurement results for the strings 6 that are received from the sensor units 10 to the host server. The host server determines whether there are any faults in the strings 6 on the basis of the measurement results for the strings 6 that are received from the sensor units 10 via the management unit 9. Here, faults (malfunctions) may be diagnosed using any well-known logic. Japanese Patent Application Laid-Open Publication No. 2010-123880, for example, discloses one example of such fault determination logic (see paragraph [0034], for example). Alternatively, the sensor units 10 or the management unit 9 may perform this fault diagnosis process instead of the host server. In this case, the diagnostic results may be sent to the host server from the sensor units 10 or from the management unit 9, and the host server may then add those results to a diagnostic results log.

<Functional Configuration of Sensor Unit>

Next, the functional configuration of the sensor unit 10 according to this embodiment of the present invention will be described with reference to FIG. 3. As illustrated in FIG. 3, the sensor unit 10 according to this embodiment of the present invention includes a plurality of external terminals 21 to 24 that are connected to the solar cell modules 5. More specifically, the external terminal 21 is connected to a positive terminal 5a of the solar cell module 5 that is arranged upstream of the sensor unit 10, and the current from that upstream solar cell module 5 is input to that external terminal 21. The external terminal 22 is connected to a negative terminal 5b of the solar cell module 5 that is arranged downstream of the prescribed upstream solar cell module 5 described above, and current is output to that downstream solar cell module 5. The external terminal 23 is connected to a positive terminal 5a of the solar cell module 5 to which an external terminal 22 is connected, and the current output from that solar cell module 5 is input to that external terminal 23. The external terminal 24 is connected to a negative terminal 5b of the solar cell module 5 that is arranged downstream of the sensor unit 10, and current is output to that downstream solar cell module 5.

Therefore, in a prescribed string 6, current flows from the furthest upstream solar cell module 5 through the sensor unit 10 and towards the furthest downstream solar cell module 5. During this process, the current from the prescribed solar cell module 5 that is upstream of the sensor unit 10 flows through a line connecting the external terminal 21 and the external terminal 22 and is then output to the downstream solar cell module 5. Moreover, the current from that downstream solar cell module 5 flows through a line connecting the external terminal 23 and the external terminal 24 of the sensor unit 10 and is then output to the solar cell module 5 that is downstream of the sensor unit 10. Therefore, using a current sensor 103 of the sensor unit 10 to measure the current flowing through the line connecting the external terminal 21 and the external terminal 22 is equivalent to measuring the current flowing through the overall corresponding string 6.

The sensor unit 10 according to this embodiment of the present invention includes a power supply unit 101, a microcomputer 102, the current sensor 103, and a wireless unit 104. The power supply unit 101 is connected between the external terminal 23 and the external terminal 24 and may include a capacitor (not illustrated in the figure) that is charged by power supplied via these terminals from the solar cell modules 5, for example. The power supply unit 101 is electrically connected to the electronic components included in the sensor unit 10 such as the microcomputer 102 and the wireless unit 104 and functions as a power supply for these electronic components.

The current sensor 103 is arranged on the line connecting the external terminal 21 and the external terminal 22 and is configured to measure the current flowing through the corresponding string 6. The current sensor 103 may be a well-known type of current sensor that includes a shunt resistor and an op-amp, for example. The current sensor 103 is an example of a sensor for measuring a physical quantity that characterizes the state of the solar cell modules 5. The meaning of the term "physical quantity" as used here is described in more detail below.

As described above, the sensor unit 10 in each of the strings 6 is configured to measure at least one of the current, voltage, power output, and temperature of the solar cell modules 5 included in the corresponding string 6 (in the present specification, these quantities are referred to collectively as "physical quantities that characterize the state of the solar cell modules"). FIG. 3 illustrates a configuration that includes only the current sensor 103, but the sensor unit 10 may also include a voltage sensor or a temperature sensor instead of or in addition to the current sensor 103. In this case, various well-known types of sensors can be used for such a voltage sensor or temperature sensor, and therefore a detailed description will be omitted here. The physical quantities that are measured by the sensor unit 10 and characterize the state of the solar cell modules 5 are not limited to the current, voltage, power, and temperature quantities described above and may include any physical quantity that can be used to diagnose faults or malfunctions in the solar cell modules 5.

The microcomputer 102 in this embodiment of the present invention is an example of a control unit and determines whether there are any faults in the strings 6 on the basis of measurement results for the strings 6 that are received from the various built-in sensors such as the current sensor 103. Here, these faults (malfunctions) may be diagnosed using any well-known logic. Moreover, the microcomputer 102 may also perform various calculation processes such as calculating the average values or peak values of the measured physical quantities that characterize the state of the strings 6. In the present specification, all such calculated values obtained by performing calculations on the measured values are included in "physical quantities that characterize the state of the solar cell modules" as long as those values can indeed be used to characterize the operating state of the solar cell modules. Thus, in the present embodiment, the average values and peak values of the measured values for the solar cell modules 5 are included in "physical quantities that characterize the state of the solar cell modules."

The wireless unit 104 is configured to wirelessly send various information such as the physical quantity measured by the current sensor 103 to other devices such as the other sensor units 10 or the management unit 9 (described later), for example. The wireless unit 104 may be configured to communicate wirelessly using a short-range wireless communication standard such as Zigbee (registered trademark) or Bluetooth (registered trademark) or a wireless communication standard such as an IEEE 802.11 wireless LAN or WiMAX, for example. The wireless unit 104 includes an antenna that emits electromagnetic waves of the frequencies used for these communication standards.

Depending on the distance between the wireless unit 104 and the management unit 9, the wireless unit 104 may wirelessly send information directly to the management unit 9, or the wireless unit 104 may first send the information to other nearby sensor units 10 and then those other sensor units 10 may send the information to the management unit 9. In other words, a multi-hop communication system may be implemented using a plurality of the sensor units 10.

As will be described in more detail later, the wireless unit 104 is housed in a wireless unit housing 14 within the sensor unit 10. Moreover, in one embodiment, the external terminals 21 to 24 are formed in a main case 12 for the sensor unit 10. In one embodiment, the power supply unit 101, the microcomputer 102, the current sensor 103, and any other sensors for measuring physical quantities other than current (when applicable) are housed within this main case 12. However, these components may alternatively be housed within the wireless unit housing 14.

<Configuration of Sensor Unit>

Next, the exterior appearance of a sensor unit 110 according to Embodiment 1 of the present invention as well as how the sensor unit 110 is attached to the stand frame 3 will be described with reference to FIGS. 4A and 4B to FIG. 6. In FIGS. 4A and 4B to FIG. 6, the same coordinate axes as in FIG. 1 are defined. In the following description, the face of the sensor unit 110 that contacts the stand frame 3 will be referred to as the "rear face", the face on the side opposite to the rear surface will be referred to as the "front face," and the faces that connect together the front face and the rear face in the X axis direction will be referred to as the "side faces."

As illustrated in the figures, the sensor unit 110 according to Embodiment 1 of the present invention includes a box-shaped main case 112 that is substantially rectangular when viewed from the front, a wireless unit housing 114 that has a curved shape and extends down from the bottom end of the main case 112, a flange 118a that extends outwards from the left face of the main case 112, and a flange 118b that extends outwards from the right face of the main case 112.

The main case 112 and the wireless unit housing 114 are both hollow so that electronic components can be housed thereinside. The main case 112 and the wireless unit housing 114 are made of a weather-resistant resin such as polyethylene and are formed using an injection molding process, for example. The main case 112 and the wireless unit housing 114 may be formed as a single integrated unit so that the interior spaces thereof are connected together. For example, the main case 112 and the wireless unit housing 114 may be formed having a hollow box shape with a single interior space.

As described above, the power supply unit 101, the microcomputer 102, the current sensor 103, and various other electronic components are housed inside of the main case 112. Similarly, the abovementioned wireless unit 104 is housed inside of the wireless unit housing 114. In Embodiment 1, the bottom end of the flange 118a and the bottom end of the flange 118b are connected together by an imaginary line T which can be used to define an imaginary face that is parallel to the upper face of the main case 112 as the boundary between the main case 112 and the wireless unit housing 114. Thus, the curved face of the wireless unit housing 114 is formed on the side that is closer to the region in which the wireless unit 104 is housed than to the main case 112 that houses the current sensor 103.

More specifically, the curved face of the wireless unit housing 114 has a semicircular shape. In other words, all parts of the outer face of the wireless unit housing 114 are substantially equidistant from the wireless unit 104. This curved shape reduces the interference among the electromagnetic waves emitted from the wireless unit 104, thereby improving communication quality. Moreover, this curved shape facilitates miniaturization of the overall sensor unit 110.

A groove 120a and a groove 120b are respectively formed on the outer surfaces of the flange 118a and the flange 118b. As will be described in more detail below, bands 30a and 30b for attaching the sensor unit 110 to the stand frame 3 fit into these grooves 120a and 120b.

As illustrated in the figures, the flange 118a and the flange 118b of Embodiment 1 are formed having ring-shaped shapes that run around the peripheries of the left side face and the right side face of the main case 112, respectively. Moreover, on the left side face of the main case 112, an external terminal 121 and an external terminal 122 are exposed from the part surrounded by the flange 118a, and on the right side face of the main case 112, an external terminal 123 and an external terminal 124 are exposed from the part surrounded by the flange 118b. In other words, the external terminals 121 and 122 and the external terminals 123 and 124 are formed protruding from the left side face and the right side face of the main case 112, respectively, and the flange 118a and the flange 118b are each formed surrounding a pair of these external terminals.

Alternatively, the flange 118a and the flange 118b may each be formed surrounding only a single external terminal. Moreover, the flange 118a and the flange 118b may each be formed only partially surrounding a pair of the external terminals. Furthermore, as long as the bands 30a and 30b can be attached between the stand frame 3 and the main case 112, the flanges 118a and 118b do not necessarily need to surround the external terminals, nor do the flanges 118a and 118b even necessarily need to be formed on the main case 112. For example, in a configuration not illustrated in the figures, a single straight groove may be formed running through the center of the front face of the main case 112 in the X axis direction. Alternatively, such single straight grooves may be formed in both the flange 118a and the flange 118b.

In Embodiment 1, the width of the flange 118a in the X axis direction is substantially equal to the height of the external terminals 121 and 122, and similar to the flange 118a, the width of the flange 118b is substantially equal to the height of the external terminals 123 and 124. Moreover, the flange 118a is formed such that the gap between the flange 118a and the corresponding external terminals 121 and 122 is small. For example, the ring-shaped flange 118a is formed such that the minor diameter thereof (that is, the diameter in the Y axis direction) is only slightly larger than the outer diameter of the external terminals 121 and 122. This makes it possible to prevent the external terminals 121 and 122 from unexpectedly loosening or getting inadvertently pulled off. Similar to the flange 118a, the flange 118b is formed such that the minor diameter thereof is only slightly larger than the outer diameter of the external terminals 123 and 124.

Figure 4:
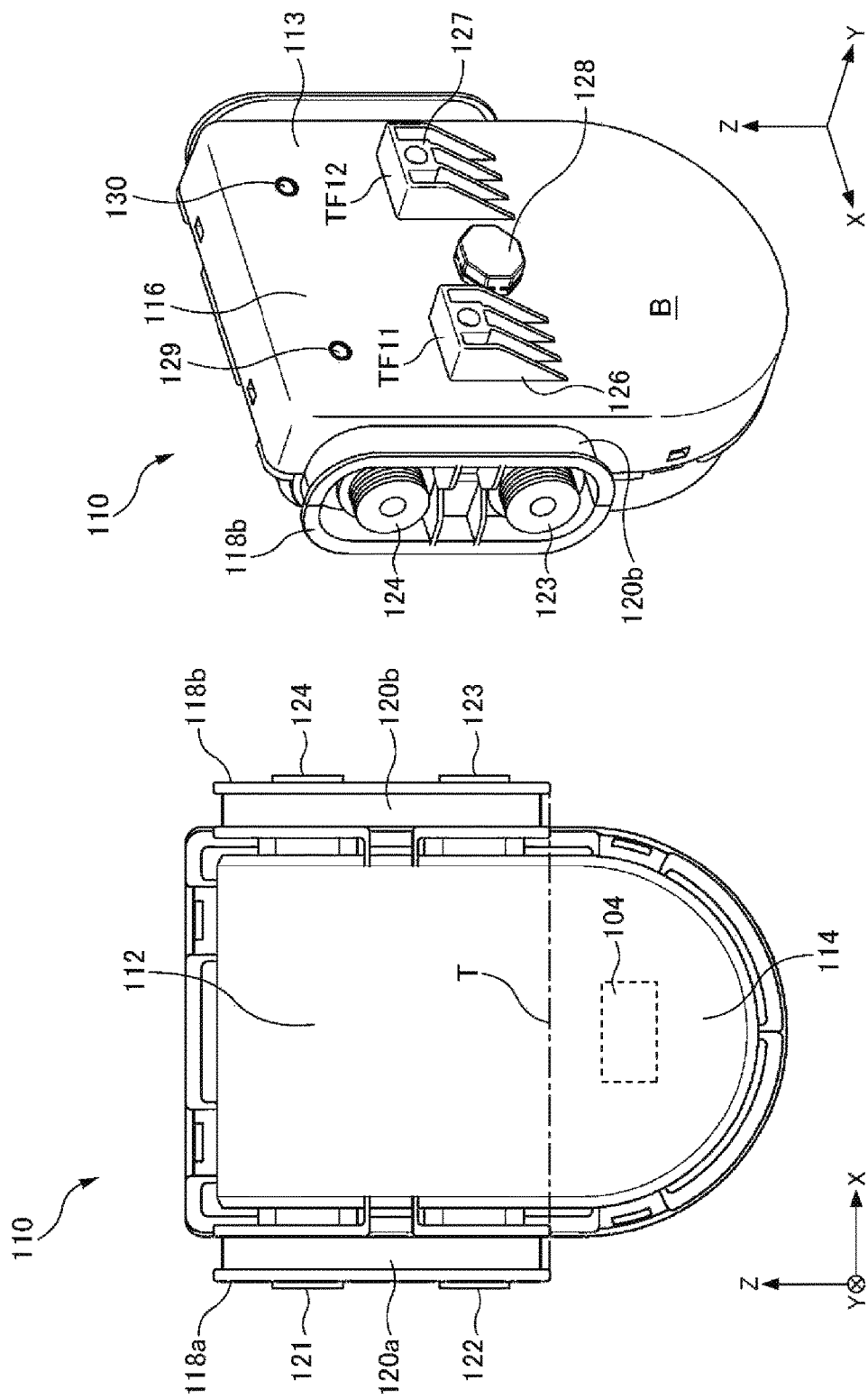
FIGS. 4A and 4B include a front view and a rear perspective view schematically illustrating a sensor unit according to Embodiment 1 of the present invention.
Figure 5:
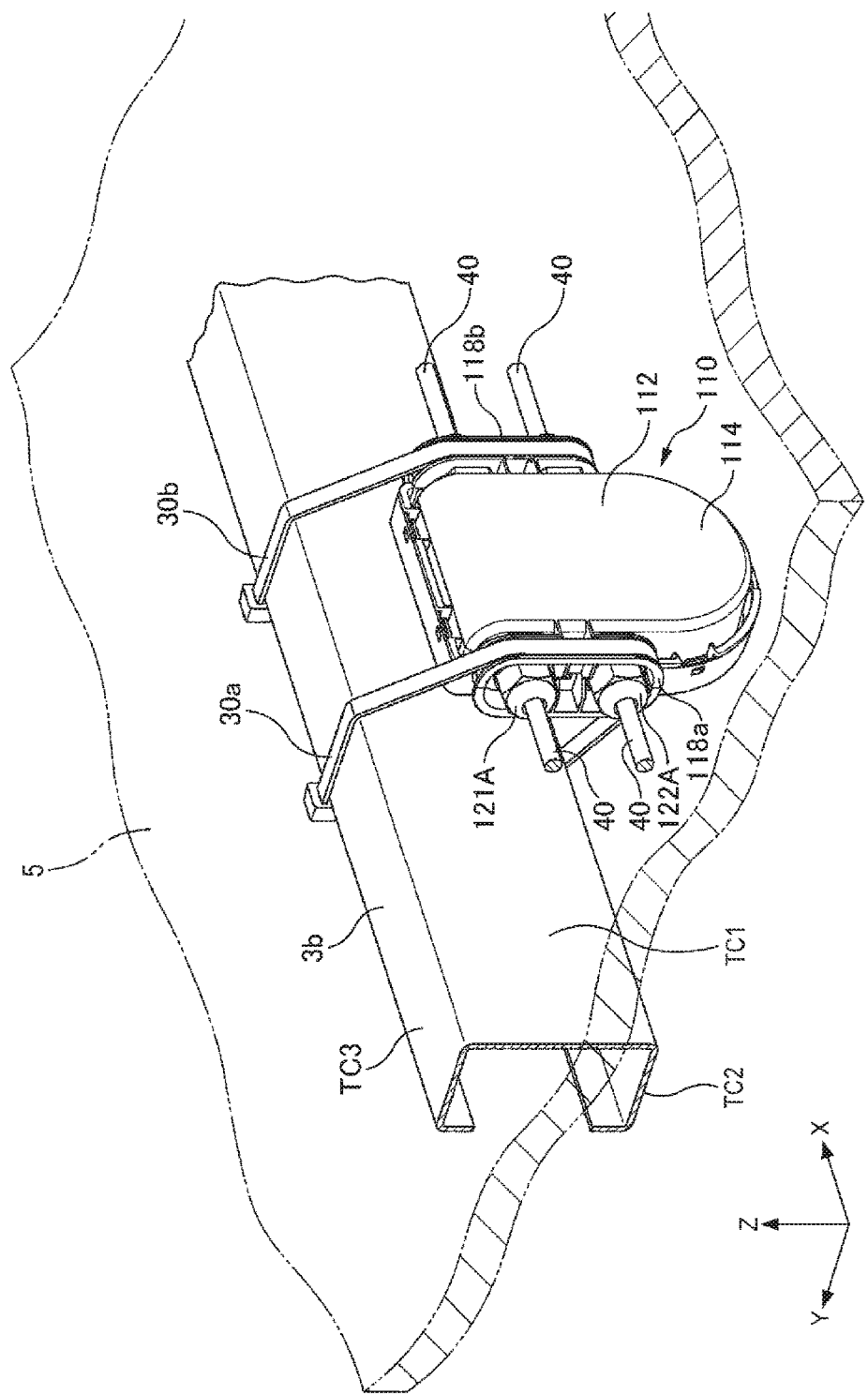
FIG. 5 is a perspective view illustrating the sensor unit according to Embodiment 1 of the present invention attached to the frame of a stand.

As illustrated in FIG. 4B, the external terminals 121 to 124 are tube-shaped, and cables 40 from the solar cell modules 5 are inserted into the main case 112 via these external terminals. Male screws are formed on the ends of the external terminals 121 to 124. Therefore, as illustrated in FIG. 5, with the cables 40 inserted into the external terminals 121 to 124, nuts 121A to 124A can be threaded onto the ends of the external terminals in order to fix together the external terminals 121 to 124 and the cables 40. Here, sandwiching seals (not illustrated in the figure) between the external terminals 121 to 124 and the nuts 121A to 124A makes it possible to prevent water moisture from infiltrating into the main case 112 via the external terminals 121 to 124.

In Embodiment 1, the negative terminal of one of the solar cell modules 5 is connected to the external terminal 122 via one of the cables 40, and the positive terminal of that solar cell module 5 is connected to the external terminal 123 via another one of the cables 40. As described above, the power supply unit 101 is connected between the external terminals 122 and 123 and functions as a power supply for the microcomputer 102, the wireless unit 104, and other electronic components. This makes it possible for the sensor unit 110 to run on power supplied from the solar cell modules 5.

The external terminal 121 is connected to the solar cell module 5 that, within the string 6 on which the sensor unit 110 is arranged, is immediately upstream of the solar cell module 5 to which the external terminal 122 and the external terminal 123 are connected. Alternatively, if the external terminal 122 and the external terminal 123 are connected to the furthest upstream solar cell module 5, the external terminal 121 is connected to the positive terminal of the power conditioner 8.

Moreover, the external terminal 124 is connected to the solar cell module 5 that, within the string 6 on which the sensor unit 110 is arranged, is immediately downstream of the solar cell module 5 to which the external terminal 122 and the external terminal 123 are connected. Alternatively, if the external terminal 122 and the external terminal 123 are connected to the furthest downstream solar cell module 5, the external terminal 124 is connected to the negative terminal of the power conditioner 8.

Next, how the sensor unit 110 is attached to a stand frame 3 will be described with reference to FIGS. 4B to 6. As illustrated in FIG. 4B, supports 126 and 127 (one example of a spacer) are formed on the rear face B of the sensor unit 110. In other words, the supports 126 and 127 protrude out from the rear face B. Here, the rear face B includes a contact surface 116 (a first contact surface), and the supports 126 and 127 are examples of protrusions. Together, the supports 126 and 127 and the bands 30a and 30b described below constitute a fastening unit. FIGS. 4A and 4B depict a configuration that includes the two supports 126 and 127, but the sensor unit 110 may include any number of supports.

The supports 126 and 127 are formed to be trapezoid-shaped when viewed in a side view (that is, from the X axis direction) and respectively include upward-facing contact surfaces TF11 and TF12 that are substantially orthogonal to the rear face B. These contact surfaces TF11 and TF12 correspond to second contact surfaces. Here, the contact surfaces TF11 and TF12 may be formed at any angle relative to the rear face B as long as upward movement of the sensor unit 110 can be prevented when the sensor unit 110 is attached to the stand frame 3.

The supports 126 and 127 are arranged such that the respective contact surfaces TF11 and TF12 thereof are substantially coplanar. Moreover, as with the supports themselves, the sensor unit 110 may include any number of the contact surfaces.

As described above, the horizontal frames 3b are formed to have a C-shaped cross section, and as illustrated in FIG. 5, this shape includes a side face TC1, a bottom face TC2, and a top face TC3. The sensor unit 110 is attached to one of the horizontal frames 3b with the contact surface 116 contacting the side face TC1 of that horizontal frame 3b and the contact surfaces TF11 and TF12 of the supports 126 and 127 contacting the bottom face TC2 of the horizontal frame 3b. The solar cell module 5 rests on the top face TC3 of the horizontal frame 3b.

In order to attach the sensor unit 110 to the stand frame 3, the sensor unit 110 is arranged such that the contact surface 116 of the main case 112 contacts one face TC1 of the horizontal frame 3b and such that the contact surfaces TF11 and TF12 of the supports 126 and 127 contact another face (the bottom face TC2) of the horizontal frame 3b, and then the bands 30a and 30b are respectively fitted into the groove 120a and the groove 120b and fastened around the horizontal frame 3b. Here, the band 30a and the band 30b are the well-known Insulok cable ties, for example. Insulok cable ties are a type of fastener made of an elastic resin material such as polypropylene and have a long, thin band part and an insertion part. When the cable tie is fastened, the band part is inserted into the insertion part, and a pawl formed in the insertion part engages protrusions formed in the band part.

As illustrated in FIGS. 5 and 6, the supports 126 and 127 are attached to the rear face B of the main case 112 (that is, to the contact surface 116 that contacts the stand frame) and are arranged separated from one another. Alternatively, the supports 126 and 127 may be formed as integrated parts of the main case 112. Moreover, the supports 126 and 127 may be formed separately from the main case 112, and then these separately formed supports 126 and 127 may be attached to the rear face B of the main case 112 (that is, to the contact surface 116) using an adhesive or the like. The supports 126 and 127 of Embodiment 1 respectively include contact surfaces TF11 and TF12 that are substantially orthogonal to the contact surface 116 of the main case 112. When the sensor unit 110 is attached to the stand frame 3, the contact surfaces TF11 and TF12 contact the face TC2 of the stand frame 3, while the contact surface 116 contacts the face TC1. This makes it possible to attach the sensor unit 110 to the stand frame in a more stable manner.

In Embodiment 1, when the sensor unit 110 is attached to the stand frame 3 (that is, to the horizontal frame 3b), the supports 126 and 127 are arranged between the stand frame and the wireless unit housing 114. In other words, when the sensor unit 110 is attached to the horizontal frame 3b, the supports 126 and 127 contact the face TC2 of the horizontal frame 3b and therefore prevent the sensor unit 110 from moving upwards. Moreover, the contact surfaces TF11 and TF12 of the supports 126 and 127 contact the face TC2 of the horizontal frame 3b and therefore also prevent the sensor unit 110 from rotating towards the face TC2 side. In other words, the supports 126 and 127 prevent the sensor unit 110 from moving in a direction that would bring the wireless unit 104 closer to the stand frame 3. This makes it possible to reliably separate the antenna of the wireless unit 104 housed in the wireless unit housing 114 from the stand frame 3 by a distance D.

This distance D can be adjusted by changing the positions of the supports 126 and 127. Increasing the distance D decreases the electromagnetic shielding effect of the stand frame 3 on the antenna of the wireless unit 104, thereby making it possible to reduce any deterioration in the quality of wireless communications performed using the antenna. In other words, arranging the supports 126 and 127 higher up on the sensor unit 110 makes it possible to increase the distance D between the stand frame 3 and the antenna of the wireless unit 104 that is housed in the wireless unit housing 114, thereby making it possible to reduce any deterioration in communication quality. The distance D may be maximized to the extent that doing so does not result in the sensor unit 110 rotating around the X axis when the sensor unit 110 is attached to the stand frame 3 using the bands 30a and 30b.

Meanwhile, as long as sufficient communication quality can be achieved, the supports 126 and 127 can be arranged lower down on the sensor unit 110, which decreases the distance D between the stand frame 3 and the antenna of the wireless unit 104 but makes it possible to increase the contact area between the sensor unit 110 and the stand frame 3. This, in turn, makes it possible to fix the sensor unit 110 to the stand frame 3 in a more stable manner. Therefore, in consideration of both of these factors, the supports 126 and 127 are positioned in a way that maximizes the distance D between the wireless unit 104 and stand frame 3 while still ensuring that the sensor unit 110 can be stably attached to the stand frame 3.

As illustrated in FIG. 4B, a vent filter 128 is arranged between the supports 126 and 127. The vent filter 128 is an example of a filter and makes the main case 112 waterproof while still allowing air to flow between the exterior and interior thereof. The vent filter 128 may also have a pressure-adjusting function or a dust-prevention function. In Embodiment 1, a screw-on vent filter is used, but any vent filter of the type described above may be used. Moreover, the vent filter 128 may be attached at a location other than the region between the supports 126 and 127.

Furthermore, as illustrated in FIG. 4B, screw holes 129 and 130 are formed in the contact surface 116. Various types of members such as the attachment described below can be attached via these screw holes.

As described above, in Embodiment 1 of the present invention, with the contact surface 116 of the main case 112 contacting the stand frame 3, the band 30a and the band 30b are respectively fitted into the groove 120a and the groove 120b of the main case 112 and then fastened around the stand frame 3, thereby making it possible to attach the sensor unit 110 to the stand frame 3 without using fastening bolts. The groove 120a and the groove 120b are formed in the outer surface of the main case 112, thereby making it possible to easily position the band 30a and the band 30b in the corresponding grooves 120a and 120b.

<Embodiment 2>

Next, a sensor unit according to Embodiment 2 of the present invention will be described with reference to FIGS. 7A and 7B to FIG. 10. The solar power generation system to which the sensor unit according to the present embodiment is applied is the same as the solar power generation system in Embodiment 1, and therefore a description will be omitted here. Moreover, the functional configuration of the sensor unit according to the present embodiment is the same as the functional configuration of the sensor unit according to Embodiment 1, and therefore a description will likewise be omitted here. The main components of the sensor unit according to the present embodiment (such as a main case 212, a wireless unit housing 214, a contact surface 216, supports 226 and 227, and contact surfaces TF21 and TF22) have the same structures as the corresponding components of Embodiment 1, and therefore a description of these components that are the same will be omitted here. The main differences between the sensor unit according to the present embodiment and the sensor unit according Embodiment 1 are in the external terminals and the vent filter.

Next, the external terminals and the vent filter of the sensor unit according to Embodiment 2 will be described in detail. Note that in Embodiment 2, the same coordinate axes as in Embodiment 1 are defined. Moreover, the front face, rear face, and side faces of the sensor unit according to Embodiment 2 are defined in the same manner as in Embodiment 1.

Similar to the external terminals 121 to 124 of Embodiment 1, the external terminals 221 to 224 of Embodiment 2 are tube-shaped, with the pair of adjacent external terminals 221 and 222 protruding outwards from the left side face of the main case 212 and the pair of adjacent external terminals 223 and 224 protruding outwards from the right side face of the main case 212. Moreover, the cables 40 from the solar cell modules 5 are inserted into the main case 212 via these external terminals 221 to 224.

Figure 9:
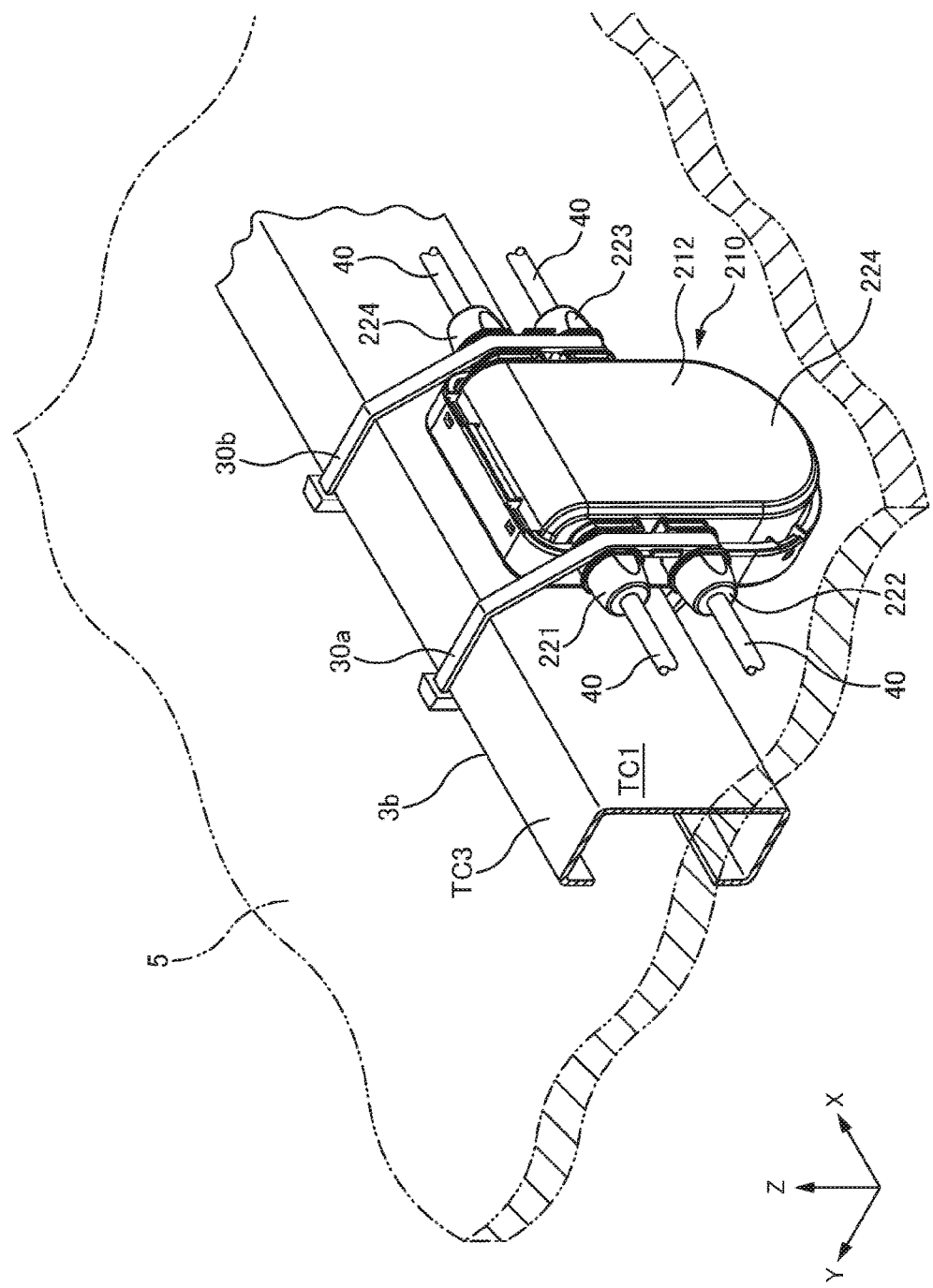
FIG. 9 is a perspective view illustrating the sensor unit according to Embodiment 2 of the present invention attached to the frame of a stand.

The external terminals 221 to 224 of the present embodiment are different from the external terminals 121 to 124 of Embodiment 1 in that bands 30 are wrapped directly around the external terminals 221 to 224. In other words, as illustrated in FIGS. 9 and 10, a band 30a is wrapped around the external terminals 221 and 222 and the stand frame 3, and similarly, a band 30b is wrapped around the external terminals 223 and 224 and the stand frame 3.

When the bands 30 are wrapped around the external terminals 221 to 224 and the stand frame 3, the band 30a applies a force to the pair of external terminals 221 and 222 that acts in the directions going from those external terminals towards one another, and likewise the band 30b applies a force to the pair of external terminals 223 and 224 that acts in the directions going from those external terminals towards one another. The resulting stress from these forces is concentrated at the boundaries between the external terminals 221 to 224 and the main case 212. To withstand this stress, reinforcing parts 231 to 234 that have a greater diameter than the external terminals are respectively formed on the main case 212-side ends of the external terminals 221 to 224.

Moreover, the external terminals 221 and 222 and a bridge structure 238 (described below) include flanges 236 for guiding the band 30a, and similarly, the external terminals 223 and 224 and a bridge structure 239 (described below) include flanges 237 for guiding the band 30b. When a sensor unit 210 is fastened to the stand frame 3 using the bands 30a and 30b, the bands 30a and 30b respectively fit into the grooves formed between the reinforcing parts 231 and 232 and the flanges 236 and the groove formed between the reinforcing parts 233 and 234 and the flanges 237.

Figure 8:
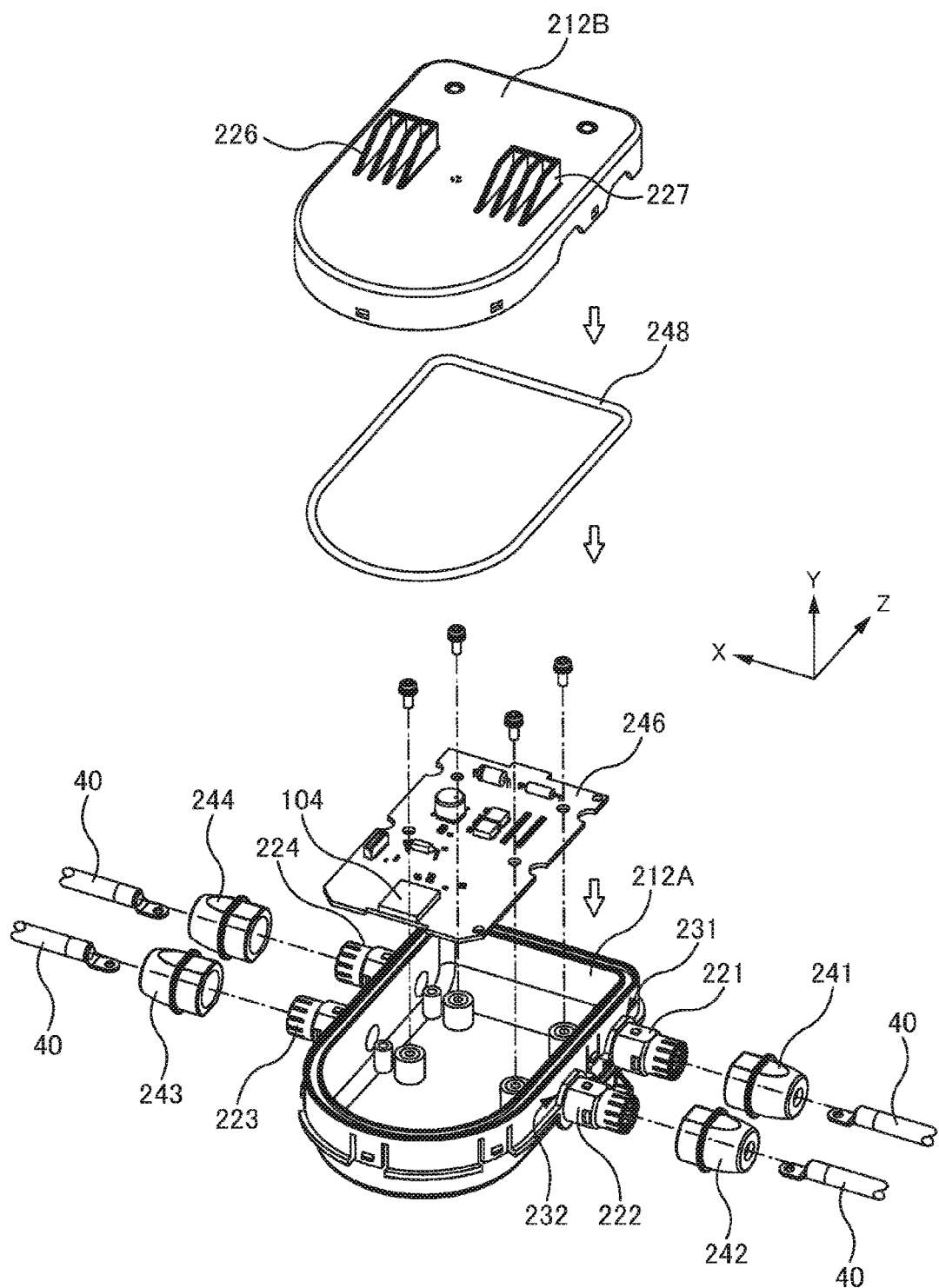
FIG. 8 is an exploded perspective view schematically illustrating the sensor unit according to Embodiment 2 of the present invention.

As illustrated in FIG. 8, tube-shaped waterproofing caps 241 to 244 are fitted onto the ends of the external terminals 221 to 224. Moreover, holes for allowing the cables from the solar cell modules 5 to be inserted are formed in the ends of the waterproofing caps 241 to 244.

The inner peripheral surfaces of the waterproofing caps 241 to 244 decrease in diameter moving towards the ends thereof. Moreover, a plurality of slits are formed around the outer peripheral surfaces of the ends of the external terminals 221 to 224. Therefore, when the waterproofing caps 241 to 244 are fitted onto the ends of the external terminals 221 to 224, the ends of the external terminals 221 to 224 press into the inner peripheral surfaces of the waterproofing caps 241 to 244 and securely fit the cables 40. This prevents water moisture from infiltrating into the main case 212 via the external terminals 221 to 224.

Returning to FIGS. 7A and 7B, the bridge structure 238 is formed between the external terminals 221 and 222, and the bridge structure 239 is formed between the external terminals 223 and 224. These bridge structures act both as reinforcing parts that provide additional resistance against the stresses described above and as guides for guiding the bands 30 together with the external terminals 221 to 224. The bridge structures 238 and 239 correspond to first and second guides.

More specifically, the bridge structure 238 is formed continuously between the reinforcing part 231 and the reinforcing part 232 and is arranged further away from the left side face of the main case 212 than are these reinforcing parts. Similarly, the bridge structure 239 is formed continuously between the reinforcing part 233 and the reinforcing part 234 and is arranged further away from the right side face of the main case 212 than are these reinforcing parts. In other words, the bridge structures 238 and 239 are literally shaped like bridges that respectively span between the reinforcing parts 231 and 232 and the reinforcing parts 233 and 234.

Furthermore, the bridge structure 238 guides the band 30a so that the band 30a can be wrapped around the external terminals 221 and 222 and the stand frame 3. Similarly, the bridge structure 239 guides the band 30b so that the band 30b can be wrapped around the external terminals 223 and 224 and the stand frame 3.

The main case 212 includes a vent filter 228 that makes the main case 212 waterproof while still allowing air to flow between the exterior and interior thereof. The vent filter 228 includes air holes formed in the main case 212 and a waterproof and air-permeable membrane that covers the air holes from the inside of the main case 212. In the present embodiment, this membrane is thermally welded to the inner surface of the main case 212, but the method used to attach the membrane to the main case 212 is not limited to thermal welding.

The vent filter 228 is arranged between the supports 226 and 227. This is to reduce the likelihood of a worker's hand touching the air holes of the vent filter 228 when attaching the sensor unit 210 to the stand frame 3 and thereby plugging the air holes of the vent filter with any dirt or dust that may be on the worker's hand. Therefore, the vent filter 228 may be positioned in any location as long as that location is not prone to being touched by a worker.

Next, the exploded view in FIG. 8 of the sensor unit 210 according to Embodiment 2 will be described. A case of the sensor unit 210 includes a main unit 212A and a cover 212B, and within this case the main case 212 and the wireless unit housing 214 are formed as a single integrated space. The main unit 212A houses a circuit board 246 that includes the wireless unit 104. This circuit board 246 is connected to the cables 40 via the external terminals 221 to 224. Moreover, a gasket 248 that runs around the periphery of the main unit 212A is sandwiched between the main unit 212A and the cover 212B. This makes the sensor unit 210 waterproof.

As illustrated in FIGS. 9 and 10, the sensor unit 210 according to Embodiment 2 is fastened to the stand frame 3 using the bands 30. More specifically, with the contact surface 216 of the main case 212 contacting the face TC1 of the horizontal frame 3b and the contact surfaces TF21 and TF22 contacting the face TC2 of the horizontal frame 3b, the band 30a is wrapped around the external terminals 221 and 222 and the bridge structure 238 and the horizontal frame 3b, and the band 30b is wrapped around the external terminals 223 and 224 and the bridge structure 239 and the horizontal frame 3b.

In the present embodiment, the contact surfaces TF21 and TF22 separate the stand frame 3 by a prescribed distance from the wireless unit 104 that is housed inside of the case of the sensor unit 210. This makes it possible to reduce the electromagnetic shielding effect due to the stand frame 3 and thereby makes it possible to maintain a prescribed communication quality.

As illustrated in FIG. 8, the main case 212 and the wireless unit housing 214 are formed as a single integrated space, and the external terminals 221 to 224 are formed as integrated parts of the main unit 212A. This reduces the number of component parts in the sensor unit 210 in comparison with Embodiment 1 and therefore makes it possible to reduce production costs.

<Modification Example>

Next, a modification example of Embodiments 1 and 2 will be described with reference to FIGS. 11 to 14. In the modification example, the solar cell module 5 is not mounted on a stand 1, and therefore the sensor unit is attached to the frame of the solar cell module itself. This may be because the solar cell module is attached to a float for floating on water or because the solar cell module is installed on a roof, for example. Alternatively, the modification example may correspond to a case in which bands are not used to fasten the sensor unit to the frame of the stand 1 on which the solar cell module 5 is mounted. Here, the "frame of the solar cell module itself" is an example of a frame for a solar cell module.

Here, the sensor unit according to Embodiment 2 is used, but the sensor unit according to Embodiment 1 or another sensor unit may be used instead. Moreover, in the present modification example, the supports of Embodiments 1 and 2 do not necessarily need to be formed. Note that the coordinate axes defined in FIGS. 11 to 14 are the same as the coordinate axes in Embodiments 1 and 2. In other words, the Z axis direction is defined to be the vertical direction, the X axis direction is defined to be the lengthwise direction of a base 14, and the Y axis direction is defined to be the direction in which hooking parts 12 extend.

Figure 11:
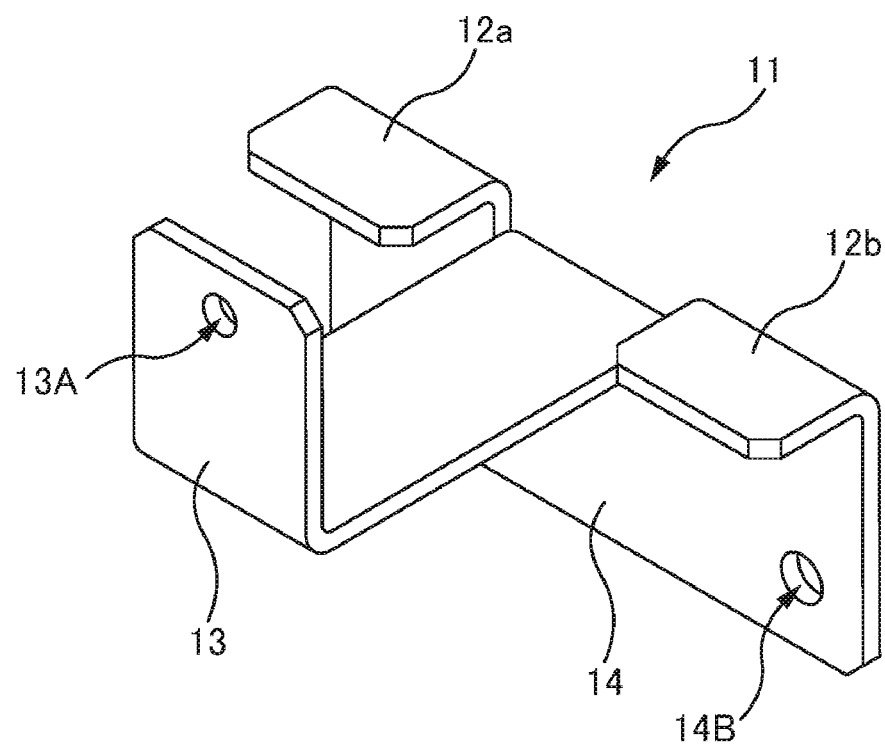
FIG. 11 is a perspective view illustrating an example of an attachment that can be attached to the sensor unit according to the embodiments of the present invention.

In the modification example, an attachment 11 (one example of a spacer) of the type illustrated in FIG. 11 is used as a fastening unit for attaching the sensor unit 210 to a frame 5a of the solar cell module 5. The attachment 11 includes the base 14, hooking parts 12a and 12b that hook onto the frame 5a, and a coupling part 13 that is coupled to the frame 5a once the hooking parts 12a and 12b have been hooked onto the frame 5a. From the perspective of strength, it is preferable that the attachment 11 be made of metal, but the attachment 11 may also be made of a material other than metal.

Figure 12:
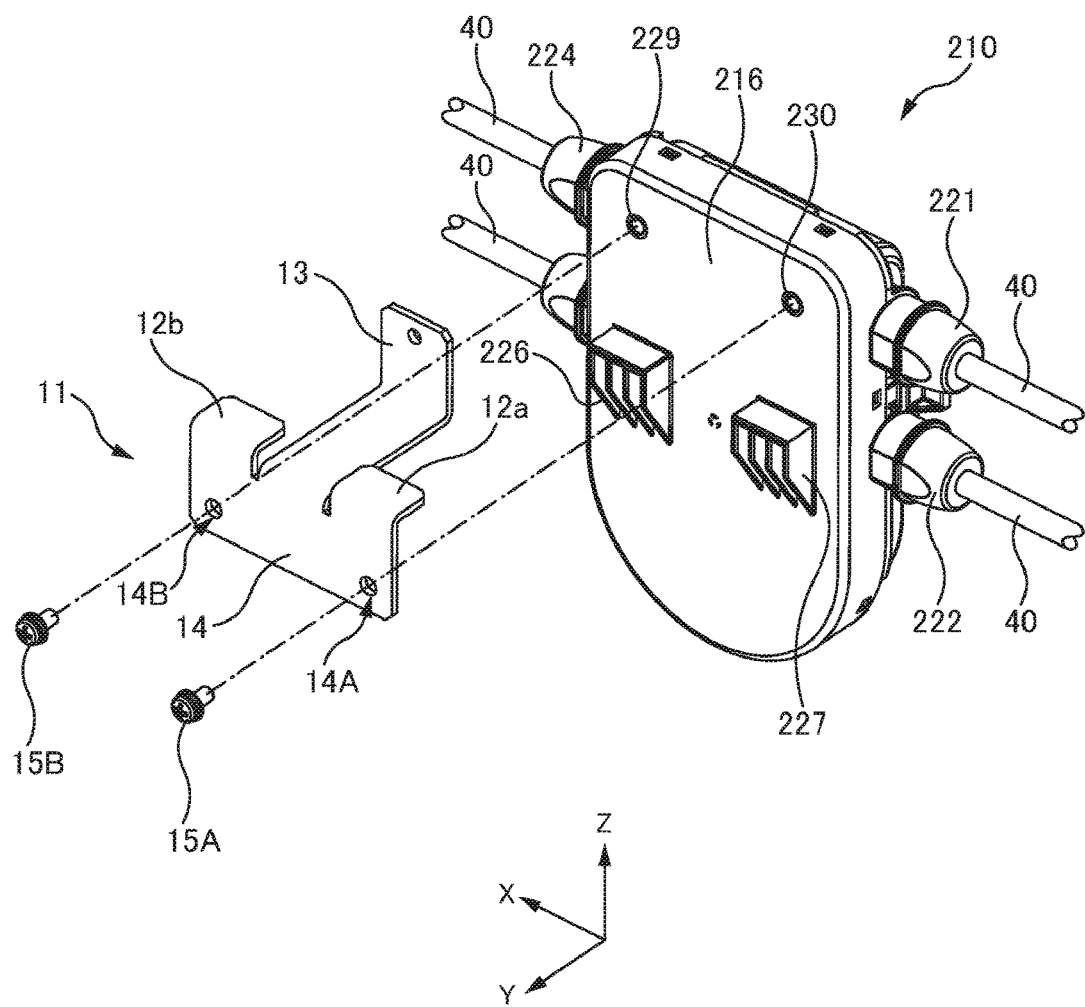
FIG. 12 is a perspective view illustrating how the attachment illustrated in FIG. 11 is attached to the sensor unit according to Embodiment 2 of the present invention.

More specifically, as illustrated in FIG. 12, the base 14 is a rectangular plate that includes holes 14A and 14B corresponding to screw holes 229 and 230 formed in the sensor unit 210. Therefore, the attachment 11 can be fixed to the sensor unit 210 by bringing the attachment 11 into contact with the contact surface 216 of the sensor unit 210 and then threading screws 15A and 15B through the holes 14A and 14B in the base 14 and into the screw holes 229 and 230.

Returning to FIG. 11, the hooking parts 12a and 12b and the coupling part 13 protrude out in a substantially orthogonal manner from the edge of one side of the rectangular base 14. The coupling part 13 also includes a part that is bent upwards and has a screw hole 13A formed in the end thereof.

Figure 14:
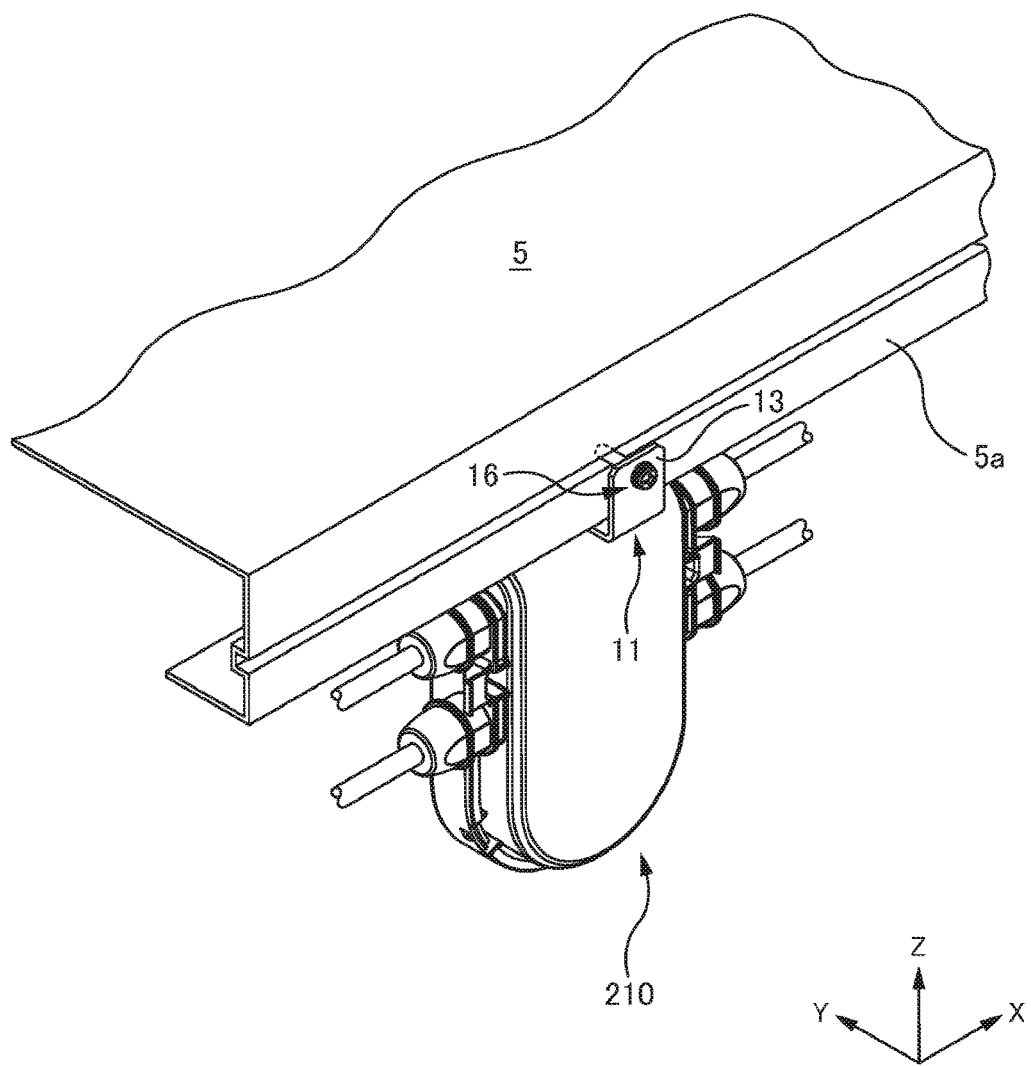
FIG. 14 is a front perspective view of the same state illustrated in FIG. 13.

The coupling part 13 is arranged between the hooking parts 12a and 12b when viewed from the Z axis direction. Moreover, when viewed from the negative Y axis direction, the coupling part 13 is arranged at a lower level than the hooking parts 12a and 12b. In addition, the coupling part 13 is longer in the Y axis direction than the edge of the frame 5a of the solar cell module 5. Therefore, as illustrated in FIG. 13, the hooking parts 12a and 12b can hook onto the edge of the frame 5a of the solar cell module 5. Moreover, as illustrated in FIG. 14, the coupling part 13 is coupled to the frame 5a by hooking the hooking parts 12a and 12b onto the edge of the frame 5a and then threading a screw 16 into the screw hole 13A formed in the end of the coupling part 13 such that the tip of the screw 16 presses against the frame 5a.

Using the attachment 11 to fix the sensor unit 210 to the frame 5a of the solar cell module 5 itself separates the wireless unit 104 included in the sensor unit 210 from the frame 5a by a prescribed distance. Here, this prescribed distance is greater than the prescribed distance D in Embodiments 1 and 2, thereby making it possible to further reduce the electromagnetic shielding effect of the frame 5a and thus further improve communication quality.

As described above, the sensor unit 110 includes the current sensor 103 that measures the current output from the solar cell modules 5, the wireless unit 104 that wirelessly outputs the measurement results from the current sensor 103, the main case 112 and the wireless unit housing 114 that house the current sensor 103 and the wireless unit 104, and the fastening unit for attaching the main case 112 and the wireless unit housing 114 to the frame of the solar cell module 5 (the stand frame 3 or the frame 5a of the solar cell module itself, for example) such that the wireless unit 104 is separated by a prescribed distance from the frame of the solar cell module. In this embodiment, when the case of the sensor unit 110 is attached to the frame of the solar cell module, the wireless unit 104 is separated from the frame of the solar cell module 5 by a prescribed distance. This makes it possible to reduce the electromagnetic shielding effect due to the frame of the solar cell module 5 and thereby makes it possible to maintain a prescribed communication quality.

Moreover, it is preferable that the fastening unit include the bands 30 that fasten the main case 112 to the stand frame 3 as well as the protrusions (such as the support 126) that protrude out from the contact surface 116 of the main case 112 that contacts the stand frame 3 and contact the stand frame 3 so as to prevent the main case 112 from moving in a direction that would bring the wireless unit 104 closer to the stand frame 3 once the main case 112 has been fastened to the stand frame 3 using the bands 30. In this embodiment, the protrusions prevent the main case 112 from moving in a direction that would bring the wireless unit 104 closer to the stand frame 3 once the main case 112 has been fastened to the stand frame 3 using the bands 30. This makes it possible to reduce the electromagnetic shielding effect due to the frame and to thereby maintain a prescribed communication quality.

Furthermore, it is preferable that the support 126 (127) include a contact surface TF11 (TF12) that contacts the stand frame 3 when the main case 112 is fastened to the stand frame 3. In this configuration, the contact surface TF11 (TF12) contacts the stand frame 3, thereby making it possible to fix the sensor unit 110 to the stand frame 3 in a stable manner.

Moreover, the contact surface TF11 (TF12) is substantially orthogonal to the contact surface 116. This ensures that the contact surface TF11 (TF12) reliably contacts the stand frame 3, thereby making it possible to fix the sensor unit 110 to the stand frame 3 in an even more stable manner.

In addition, it is preferable that the main case 212 include tube-shaped first terminals (such as the external terminal 222) that protrude outwards from the left side face of the main case 212, allow the cables 40 from the solar cell modules 5 to be inserted into the main case 212, and can be looped within the band 30*a* that is wrapped around the stand frame 3. It is also preferable that the main case 212 include tube-shaped second terminals (such as the external terminal 223) that protrude outwards from the right side face of the main case 212, allow other cables 40 from the solar cell modules 5 to be inserted into the main case 212, and can be looped within the band 30*a* that is wrapped around the stand frame 3. Here, the sensor unit 210 can be securely fixed to the stand frame 3 by respectively wrapping the bands 30*a* and 30*b* around the first and second terminals and the stand frame 3. Moreover, here the first and second terminals not only allow the cables 40 from the solar cell modules 5 to be inserted but also provide surfaces around which the bands 30*a* and 30*b* can be wrapped. This reduces the number of components in the sensor unit 210 and is advantageous in terms of reducing production costs.

Furthermore, it is preferable that the main case 212 include the first reinforcing parts (such as the reinforcing part 232) that are formed on the main case 212-side ends of the first terminals and have a greater diameter than the first terminals, as well as the second reinforcing parts (such as the reinforcing part 233) that are formed on the main case 212-side ends of the second terminals and have a greater diameter than the second terminals. These first and second reinforcing parts make it possible to give the main case 212 greater strength against the stresses applied to the first and second terminals by the bands 30*a* and 30*b*.

In addition, it is preferable that the sensor unit 210 include the bridge structure 238 that is formed continuously with the first reinforcing parts and guides the band 30*a* so that the band 30*a* can be wrapped around the stand frame 3 and the first terminals, as well as the bridge structure 239 that is formed continuously with the second reinforcing parts and guides the band 30*b* so that the band 30*b* can be wrapped around the stand frame 3 and the second terminals. Here, the bridge structures 238 and 239 make it easier to wrap the bands 30*a* and 30*b* around the first and second terminals and the stand frame 3. This improves the efficiency of the task of fixing the sensor unit 210 to the stand frame 3.

Moreover, it is preferable that the first terminals be constituted by the pair of external terminals 221 and 222 that are adjacent to one another and protrude outwards from the left side face of the main case 212, that the second terminals be constituted by the pair of external terminals 223 and 224 that are adjacent to one another and protrude outwards from the right side face of the main case 212, that the first reinforcing parts be constituted by the pair of reinforcing parts 231 and 232 that are formed on the main case 212-side ends of the first terminals, that the second reinforcing parts be constituted by the pair of reinforcing parts 233 and 234 that are formed on the main case 212-side ends of the second terminals, that the bridge structure 238 be formed continuously between the reinforcing parts 231 and 232 and be arranged separated further away from the left side face of the main case 212 than are the reinforcing parts 231 and 232, and that the bridge structure 239 be formed continuously between the reinforcing parts 233 and 234 and be arranged separated further away from the right side face of the main case 212 than are the reinforcing parts 233 and 234. The bridge structure 238 makes it possible to counteract the force that is applied when the band 30*a* is wrapped around the external terminals 221 and 222 and that acts in the directions going from those external terminals 221 and 222 towards one another. This is also true of the bridge structure 239. Therefore, the external terminals 221 to 224 are reinforced by the bridge structures 238 and 239, which contributes to making it possible to reliably fix the sensor unit 210 in place using the bands 30*a* and 30*b*.

Furthermore, it is preferable that the external terminals 221 and 222 and the bridge structure 238 include flanges 236 for guiding the band 30*a* and that the external terminals 223 and 224 and the bridge structure 239 include flanges 237 for guiding the band 30*b*. These flanges 236 make the band 30*a* less prone to slipping off after being wrapped around the external terminals 221 and 222 and the bridge structure 238. This is also true of the flanges 237. Therefore, the sensor unit 210 can be reliably fixed to the stand frame 3 using the bands 30*a* and 30*b*.

In addition, it is preferable that the main case 112 include grooves (such as the grooves 120*a* and 120*b*) that can be looped within the bands 30 that are wrapped around the stand frame 3. Here, the bands 30 are seated within these grooves when wrapped around the stand frame 3 and are less prone to slipping out of these grooves, thereby making it possible to reliably fix the sensor unit 110 to the stand frame 3.

Moreover, it is preferable that the main case 112 include tube-shaped first terminals (the external terminals 121 and 122) that protrude outwards from the left side face of the main case 112 and allow the cables 40 from the solar cell module 5 to be inserted into the main case 112, as well as tube-shaped second terminals (the external terminals 123 and 124) that protrude outwards from the right side face of the main case 112 and allow other cables 40 from the solar cell modules 5 to be inserted into the main case 112. It is also preferable that the grooves include a groove 120*a* that is formed surrounding the first terminals and can be looped within the band 30*a* that is wrapped around the stand frame 3 and a groove 120*b* that is formed surrounding the second terminals and can be looped within the band 30*b* that is wrapped around the stand frame 3. Here, the grooves 120*a* and 120*b* make it possible to reliably fix both the left and right sides of the sensor unit 110 to the stand frame 3. Moreover, the grooves 120*a* and 120*b* protect the first and second terminals from external impacts, from the forces applied by the bands 30*a* and 30*b*, and from contamination by foreign materials. Furthermore, the grooves 120*a* and 120*b* surround the first and second terminals and make it difficult to remove the cables from the first and second terminals, thereby making it possible to prevent theft-related losses.

Furthermore, it is preferable that the attachment 11 (an example of a fastening unit) include the hooking parts 12a and 12b that hook onto the frame 5a of the solar cell module 5 itself and the coupling part 13 that is coupled to the frame 5a once the hooking parts 12a and 12b have been hooked on the frame 5a. In this embodiment, the sensor unit 210 can be reliably fastened to the frame 5a in a state in which the wireless unit 104 is separated by a prescribed distance from the frame 5a of the solar cell module 5.

In addition, it is preferable that the main case 212 include the vent filter 228 that makes the main case 212 waterproof while still allowing air to flow between the exterior and interior thereof. This embodiment makes it possible to prevent increases in pressure inside of the sensor unit 210 while still keeping the interior and exterior of the sensor unit 210 waterproof. This, in turn, improves the safety of the sensor unit 210.

Moreover, it is preferable that the vent filter 228 include air holes formed in the main case 212 and a waterproof and air-permeable membrane that covers the air holes from the inside of the main case 212. Here, forming the vent filter 228 as an integrated part of the sensor unit 210 makes it possible to reduce the number of components in the sensor unit 210 and to thereby achieve an associated reduction in production costs. This also contributes to facilitating miniaturization of the sensor unit 210.

It is preferable that the protrusions be constituted by the supports 226 and 227 that protrude out from the contact surface 216 and are separated from one another, and it is also preferable that the vent filter 228 be arranged between the supports 226 and 227. This embodiment prevents a worker's hand from touching the vent filter 228 and plugging the air holes of the vent filter 228 with dirt or dust when the worker attaches the sensor unit 210 to the stand frame 3. This ensures that the sensor unit 210 remains ventilated.

Furthermore, it is preferable that the wireless unit housing 114 that forms part of the case of the sensor unit 110 have a curved shape on the side of the case that is closer to the region in which the wireless unit 104 is housed than to the region in which the current sensor 103 is housed. This reduces weakening of the electromagnetic waves emitted from the antenna of the wireless unit 104 due to interference with the waves that reflect off of the case of the sensor unit 110. This, in turn, improves communication quality.

In addition, it is preferable that the sensor unit 210 further include the waterproofing caps 241 and 242 that allow the cables 40 to be inserted and are fitted onto the external terminals 221 and 222 as well as the waterproofing caps 243 and 244 that similarly allow the cables 40 to be inserted and are fitted onto the external terminals 223 and 224. This embodiment prevents water moisture from infiltrating into the case of the sensor unit 210 via the external terminals 221 to 224.

Moreover, it is preferable that the sensor unit 110 further include the nuts 121A and 122A that are threaded onto the male threads formed on the ends of the external terminals 121 and 122 and fix together the external terminals 121 and 122 and the cables 40 that are inserted into the external terminals 121 and 122, first seals that are sandwiched between the nuts 121A and 122A and the ends of the external terminals 121 and 122, the nuts 123A and 124A that are threaded onto the male threads formed on the ends of the external terminals 123 and 124 and fix together the external terminals 123 and 124 and the cables 40 that are inserted into the external terminals 123 and 124, and second seals that are sandwiched between the nuts 123A and 124A and the ends of the external terminals 123 and 124. This embodiment prevents water moisture from infiltrating into the case of the sensor unit 110 via the external terminals 121 to 124.

Various embodiments of the present invention were described above; however, the present invention is not limited to these embodiments. The materials, shapes, and arrangements of the components as described above are only examples of embodiments of the present invention, and various modifications may be made without departing from the spirit of the invention. It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A sensor unit, comprising:
    a sensor configured to measure a physical quantity that characterizes a state of a solar cell module;
    a wireless unit wirelessly outputting measurement results of the sensor;
    a case housing the sensor and the wireless unit; and
    a spacer configured to attach the case to a frame for the solar cell module such that the wireless unit is separated from the frame by a prescribed distance,
    wherein the frame is a stand frame on which the solar cell module is mounted,
    wherein the case is configured to be fastened to the frame by one or more bands,
    wherein the spacer includes a protrusion protruding from a first contact surface of the case that contacts the frame, said protrusion preventing movement of the case in a direction that would cause the wireless unit to be closer to the frame when the case and the frame are fastened to each other by said one or more bands, and
    wherein the case includes:
        a first terminal having a tube shape protruding outwards from one side face of the case, the first terminal being configured to introduce a cable from the solar cell module to inside of the case and configured to receive a first band that is wrapped around the first terminal and the frame; and
        a second terminal having a tube shape protruding outwards from another side face of the case, the second terminal being configured to introduce a cable from the solar cell module to inside of the case and configured to receive a second band that is wrapped around the second terminal and the frame.

2. The sensor unit according to claim 1, wherein the case further includes:
    a first reinforcing part formed on an end of the first terminal adjacent to the case and having a greater diameter than a diameter of the first terminal; and
    a second reinforcing part formed on an end of the second terminal adjacent to the case and having a greater diameter than a diameter of the second terminal.

3. The sensor unit according to claim 2, further comprising:
    a first guide formed continuously with the first reinforcing part so as to guide the first band that is wrapped around the first terminal and the frame; and
    a second guide formed continuously with the second reinforcing part so as to guide the second band that is wrapped around the second terminal and the frame.

4. The sensor unit according to claim 3,
wherein the first terminal is provided in a pair that are adjacent to each other, both protruding outwards from said one side face of the case, the pair of the first terminals being configured to introduce cables from different solar cell modules, respectively,
wherein the second terminal is provided in a pair that are adjacent to each other, both protruding outwards from said another side face of the case, the pair of the second terminals being configured to introduce cables from different solar cell modules, respectively,
wherein the first reinforcing part is provided in each of the pair of the first terminals,
wherein the second reinforcing part is provided in each of the pair of the second terminals,
wherein the first guide is formed continuously from the respective first reinforcing parts of the pair of first terminals and is located further away from said one side face of the case than the first reinforcing parts, and
wherein the second guide is formed continuously from the respective second reinforcing parts of the pair of second terminals and is located further away from said another side face of the case than the second reinforcing parts.

5. The sensor unit according to claim 4,
wherein the first terminals and the first guide each have a flange that guides the first band, and
wherein the second terminals and the second guide each have a flange that guides the second band.

6. A sensor unit, comprising:
a sensor configured to measure a physical quantity that characterizes a state of a solar cell module;
a wireless unit wirelessly outputting measurement results of the sensor;
a case housing the sensor and the wireless unit; and
a spacer configured to attach the case to a frame for the solar cell module such that the wireless unit is separated from the frame by a prescribed distance,
wherein the frame is a stand frame on which the solar cell module is mounted,
wherein the case is configured to be fastened to the frame by one or more bands,
wherein the spacer includes a protrusion protruding from a first contact surface of the case that contacts the frame, said protrusion preventing movement of the case in a direction that would cause the wireless unit to be closer to the frame when the case and the frame are fastened to each other by said one or more bands, and
wherein the case further includes one or more grooves that accommodate said one or more bands that wrap around the grooves and the frame.

7. The sensor unit according to claim 6,
wherein the case includes:
a first terminal having a tube shape protruding outwards from one side face of the case, configured to introduce a cable from the solar cell module to inside of the case; and
a second terminal having a tube shape protruding outwards from another side face of the case, configured to introduce a cable from the solar cell module to inside of the case, and
wherein the case includes:
a first groove surrounding the first terminal, configured to receive a first band wrapping around the first groove and the frame; and
a second groove surrounding the second terminal, configured to receive a second band wrapping around the second groove and the frame.

8. A sensor unit comprising: a sensor configured to measure a physical quantity that characterizes a state of a solar cell module; a wireless unit wirelessly outputting measurement results of the sensor; a case housing the sensor and the wireless unit; and a spacer configured to attach the case to a frame for the solar cell module such that the wireless unit is separated from the frame by a prescribed distance, wherein the frame is a frame of the solar cell module itself, and wherein the spacer comprises a hooking part that is configured to hook onto the frame and a coupling part that is coupled to the frame when the hooking part is hooked onto the frame.

9. The sensor unit according to claim 1, further comprising:
a first waterproofing cap into which the cable is to be inserted and that is fitted onto the first external terminal; and
a second waterproofing cap into which the cable is to be inserted and that is fitted onto the second external terminal.

10. The sensor unit according to claim 7, further comprising:
a first nut that is threaded onto male threads formed on an end of the first terminal and that fixes together the first terminal and the cable that is inserted into the first terminal;
a first seal that is sandwiched between the first nut and the end of the first terminal;
a second nut that is threaded onto male threads formed on an end of the second terminal and that fixes together the second terminal and the cable that is inserted into the second terminal; and
a second seal that is sandwiched between the second nut and the end of the second terminal.

* * * * *